(12) United States Patent
Furihata et al.

(10) Patent No.: US 8,983,214 B2
(45) Date of Patent: Mar. 17, 2015

(54) ENCODER, DECODER, AND TRANSMISSION SYSTEM

(71) Applicant: Renesas Electronics Corporation, Kawasaki-shi, Kanagawa (JP)

(72) Inventors: Hirobumi Furihata, Kawasaki (JP); Takashi Nose, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 140 days.

(21) Appl. No.: 13/865,734

(22) Filed: Apr. 18, 2013

(65) Prior Publication Data

US 2013/0287311 A1    Oct. 31, 2013

(30) Foreign Application Priority Data

Apr. 26, 2012   (JP) ................. 2012-100626

(51) Int. Cl.
| | |
|---|---|
| *G06K 9/36* | (2006.01) |
| *G06K 9/46* | (2006.01) |
| *G06T 9/00* | (2006.01) |
| *H03D 3/24* | (2006.01) |

(52) U.S. Cl.
CPC ........................ *G06T 9/00* (2013.01)
USPC ........................ 382/233; 375/376

(58) Field of Classification Search
None
See application file for complete search history.

(56) References Cited

U.S. PATENT DOCUMENTS

| | | | | |
|---|---|---|---|---|
| 3,641,494 | A | * | 2/1972 | Perrault et al. ............... 714/748 |
| 5,331,317 | A | * | 7/1994 | Davis ........................... 340/7.51 |
| 5,438,327 | A | * | 8/1995 | Toriya et al. .................. 340/9.16 |
| 6,802,030 | B2 | * | 10/2004 | Nakano et al. .................. 714/43 |
| 6,937,681 | B2 | * | 8/2005 | Watanabe ...................... 375/371 |
| 7,672,416 | B2 | * | 3/2010 | Hadzic et al. ................. 375/360 |
| 2001/0044914 | A1 | * | 11/2001 | Nakano et al. .................. 714/43 |
| 2002/0009169 | A1 | * | 1/2002 | Watanabe ...................... 375/371 |
| 2006/0222129 | A1 | * | 10/2006 | Hadzic et al. ................. 375/355 |
| 2010/0208846 | A1 | * | 8/2010 | Eng et al. ...................... 375/320 |
| 2011/0215158 | A1 | * | 9/2011 | Kargl et al. .................... 235/492 |

FOREIGN PATENT DOCUMENTS

| | | |
|---|---|---|
| JP | 2000-224242 A | 8/2000 |
| JP | 2001-69181 A | 3/2001 |

* cited by examiner

*Primary Examiner* — Bhavesh Mehta
*Assistant Examiner* — Feng Niu
(74) *Attorney, Agent, or Firm* — Sughrue Mion, PLLC

(57) ABSTRACT

An encoder includes an encoding unit that performs encoding according to a predetermined encoding method, a production unit that produces a special code which is not stipulated in the predetermined encoding method and which exhibits a higher bit change rate than that produced according to the predetermined encoding method does, and an encoding output unit that, if input data items which have not been encoded by the encoding unit are identical to each other, outputs encoded data into which a preceding one of the input data items is encoded by the encoding unit, and outputs a special code as encoded data, into which the succeeding one of the input data items is encoded, successively to the encoded data.

19 Claims, 19 Drawing Sheets

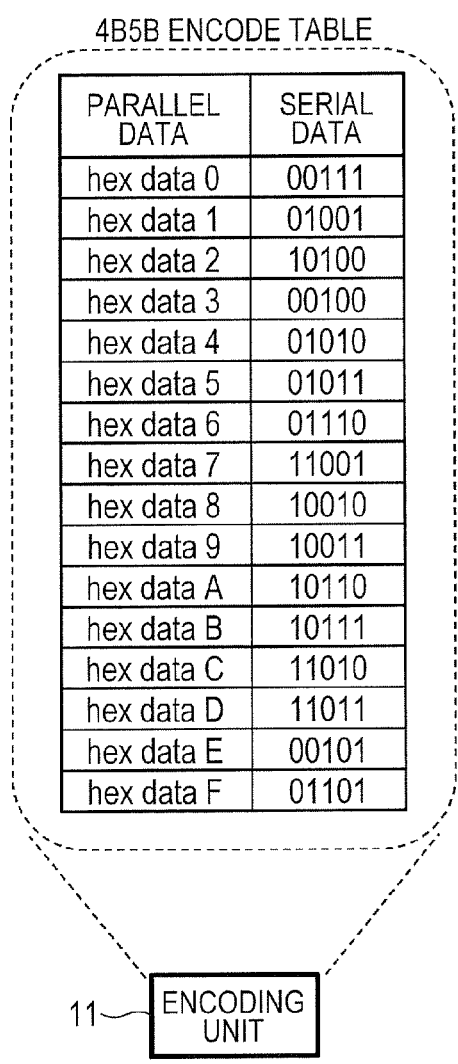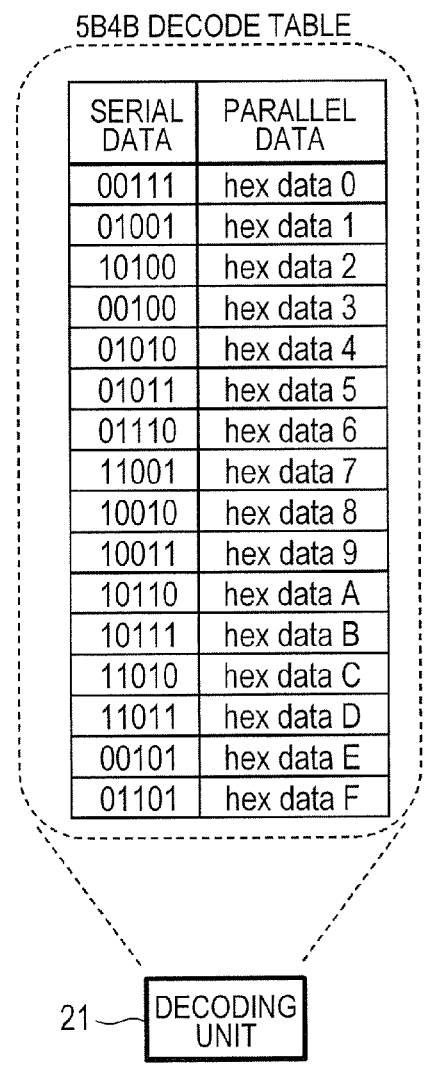

FIG. 16
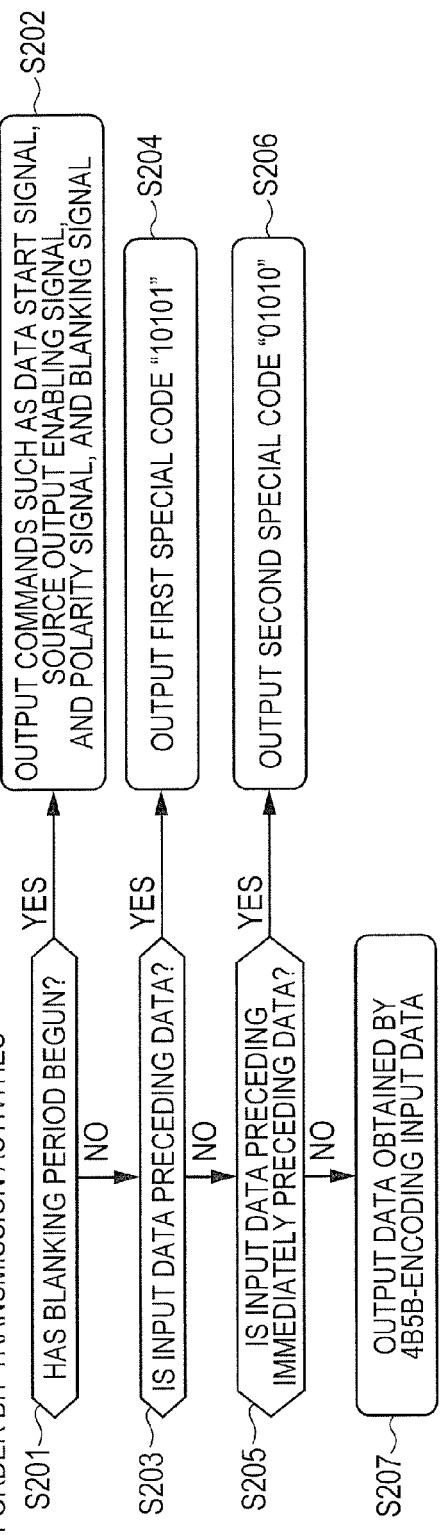
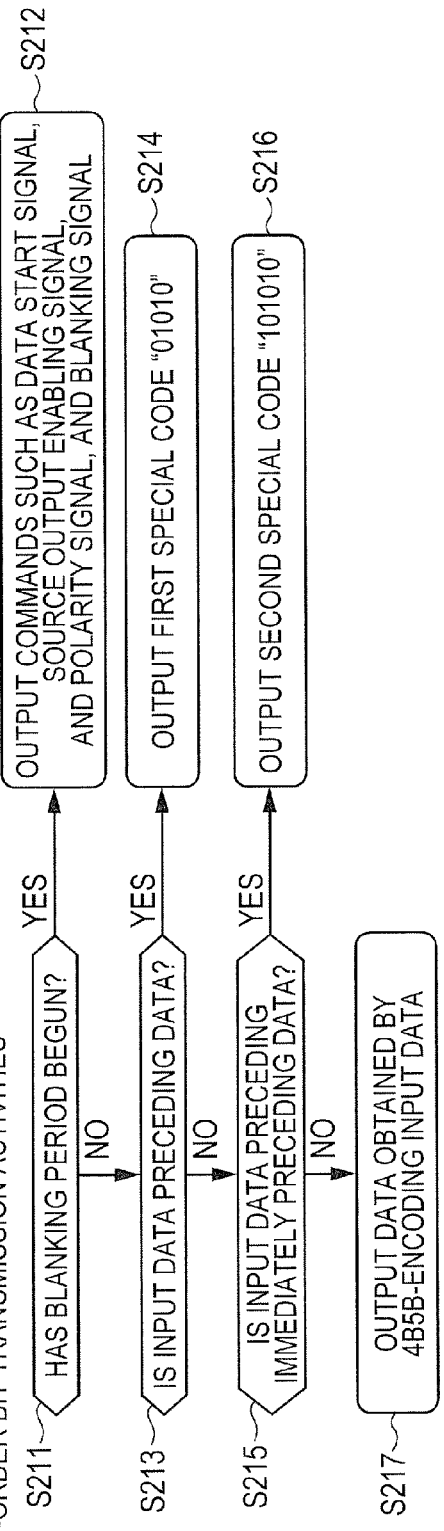

ENCODER, DECODER, AND TRANSMISSION SYSTEM

CROSS-REFERENCE TO RELATED APPLICATIONS

The disclosure of Japanese Patent Application No. 2012-100626 filed on Apr. 26, 2012 including the specification, drawings, and abstract is incorporated herein by reference in its entirety.

BACKGROUND

The present invention relates to an encoder, decoder, and transmission system, and is preferably adapted to, for example, an encoder that encodes data items into successive first and second encoded data items, a decoder, and a transmission system.

In recent years, various transmission systems have been highly requested to cope with high-speed transmission. A high-speed serial interface that enables faster data transmission than parallel data transmission is widely used.

For example, display devices including a liquid crystal panel have the frame frequency progressively increased for the purpose of realizing high definition, employing multiple colors, displaying a motion picture, and achieving three-dimensional display. A data volume to be transferred from a timing controller to a display driver integrated circuit (IC) is increasing year by year, and an interface to be employed in the timing controller and display driver IC alike is requested to operate at a high speed. Many proposals have been made of a clock embedded serial data transmission method for serially transmitting clock embedded data.

In general, in clock embedded serial data transmission, a clock reproduction method in which clock components are extracted from a signal received by a receiving unit in order to reproduce a clock is adopted. In transmission according to the clock reproduction method, when signals with the same level are successively received, the clock components cannot be highly precisely reproduced. This makes it necessary to adopt an encoding method according to which the signals with the same level do not successively appear. Specifically, assuming that a digital signal including bits which represent 1 or 0 when driven to a high level or a low level is encoded into encoded data, a run of bits with the same logic level should not be produced.

As an encoding method that prevents production of successive signals with the same level, an mBnB encoding method of encoding a signal into an mBnB code is known. This method is such that a signal of m bits long (where m denotes a natural number) is encoded into a signal of n bits long (where n denotes a natural number and is larger than m) on the basis of a certain conversion table, and then transmitted. The method is intended to suppress a run of bits with the same logic level among the n bits resulting from the encoding. The 4B5B encoding method, 8B10B encoding method, or the like is widely adopted. For example, the 4B5B encoding method is adopted by the IEEE 802.3u that is the standard for Ethernet (registered trade mark).

As related arts of performing mBnB encoding, the arts described in, for example, patent documents 1 and 2 (Japanese Patent Application Laid-Open Nos. 2001-69181 and 2000-224242) are known.

FIG. 18 shows an existing transmission system described in the patent document 1. In the patent document 1, mBnB block encoding is performed for ready identification of a clock during data transfer, and non-return-to-zero-inverted (NRZx) conversion is further performed in order to transfer the resultant data. Thus, repetition of a certain-level signal is suppressed.

Specifically, in the existing transmission system shown in FIG. 18, a 4B5B converter 901 in a transmission unit converts transmission data of four bits long into five bits in conformity with one-to-one correspondence encoding rules. A parallel-serial converter 902 converts parallel data, which has been converted from four bits to five bits, into serial data. Further, a NRZ1 converter 903 performs non-return-to-zero-inverted conversion or non-return-to-zero change-on-ones conversion on the serial data.

In the NRZ1 converter 903, when an input value is 0, the next output does not change. When the input value is 1, the next output is an inverse of the preceding bit. Therefore, in case a run of bits with the same level is inputted, the maximum number of bits comes to the sum of the number of successive 0 bits, which are inputted to the NRZ1 converter 903, and one bit. When the one-to-one correspondence encoding rules are applied, the longest run of 0s is two bits long. Therefore, the longest run of certain-level bits is three bits long.

In the existing transmission system shown in FIG. 18, in a receiving unit, a clock extraction circuit 908 reproduces a clock from receiving data sent from the transmission unit. An NRZ1 inverter 905 uses the reproduced clock to perform inversion so as to obtain an exclusive OR of current receiving data and one-clock preceding receiving data. A serial-parallel converter 906 converts the result of the inversion into parallel data of five bits long. A 4B5B inverter 907 inverts 5-bit data, which results from serial-parallel conversion, in conformity with the one-to-one correspondence encoding rules employed on the transmission side, and reproduces transmission data of four bits long.

FIG. 19 shows an existing transmitter described in the patent document 2. According to the patent document 2, in serial data transfer, a synchronizing (sync) character for use in alignment of bits is embedded in data in order to eliminate the transfer period of the sync character and reduce a transfer rate. For embedding the sync character, when identical data is repeated twice, the second data is used as the sync character. Thus, the alignment of bits and outputting of identical data are achieved.

Specifically, in the transmitter shown in FIG. 19, a timing production circuit 911 produces a series of clocks having a predetermined clock cycle. A data latch 912 is coupled to the timing production circuit 911. Every time the data latch 912 receives one of the series of clocks, the data latch 912 latches input parallel data of m bits long as latch data that is parallel data of m bits long. An mBnB conversion circuit 913 is coupled to the data latch 912, and converts the parallel latch data of m bits long into parallel conversion data of n bits long. A sync character production circuit 914 produces a sync character that is parallel data of n bits long which is inconsistent with the parallel conversion data of n bits long.

A latch data comparison circuit 917 is coupled to each of the timing production circuit 911 and data latch 912. Every time the latch data comparison circuit 917 receives one of a series of clocks as a current clock, the latch data comparison circuit 917 compares the latch data, which is parallel data of m bits long and which the data latch 912 has latched as current latch data on receipt of the current clock, with latch data which is parallel data of m bits long and which the data latch 912 has latched as preceding latch data on receipt of a preceding clock that is a clock preceding the current clock. While the current latch data is consistent with the preceding latch data, the latch data comparison circuit 917 outputs a consistency signal.

A selector 915 is coupled to each of the mBnB conversion circuit 913, sync character production circuit 914, and latch data comparison circuit 917, and receives the conversion data, which is parallel data of n bits long, and the sync character. When the selector 915 does not receive the consistency signal, the selector 915 selectively outputs the conversion data, which is parallel data of n bits long, as output data that is parallel data of n bits long. When the selector 915 receives the consistency signal, the selector 915 selectively outputs the sync character, which is parallel data of n bits long, as output data that is parallel data of n bits long. A parallel-serial conversion circuit 916 is coupled to the selector 915, and converts the parallel data of n bits long into serial data.

SUMMARY

As mentioned above, in the related arts, encoded data produced according to a clock embedded encoding method such as an mBnB encoding method is transmitted in efforts to enable reproduction of a clock in a receiver.

However, according to, for example, the mBnB encoding method, input data of m bits long is converted into encoded data of n bits long by referencing a one-to-one correspondence conversion table. This poses a problem in that when plural groups of n bits resulting from the conversion are successively transmitted as serial data items, there is a fear that a clock may not be precisely reproduced, though it depends on a combination of encoded data items resulting from the conversion.

Other objects and novel features will be apparent from the description of the present specification and the appended drawings.

According to an aspect of the present invention, a transmission system includes an encoder and decoder that are coupled to each other over a transmission line. The encoder includes an encoding unit, production unit, and encoding output unit. The encoding unit performs encoding according to a predetermined encoding method that is the clock embedded encoding method. The production unit produces a special code which is not stipulated in the predetermined encoding method and which exhibits a higher bit change rate than that produced according to the predetermined encoding method. When first and second input data items that have not been encoded by the encoding unit are identical to each other, the encoding output unit outputs first encoded data, into which the first input data is encoded by the encoding unit, and outputs the special code as second encoded data, into which the second input data is encoded, successively to the first encoded data.

The decoder includes a decoding unit, retention unit, and decoding output unit. The decoding unit performs decoding according to a predetermined encoding method that is the clock embedded encoding method. The retention unit retains decoded data produced by the decoding unit. Assuming that out of successive first and second encoded data items that have not been decoded by the decoding unit, the second encoded data is a special code which is not stipulated in the predetermined encoding method and which exhibits a higher bit change rate than that produced according to the predetermined encoding method, the decoding output unit outputs first decoded data into which the first encoded data is decoded by the decoding unit, and outputs data, which is identical to the first decoded data and is retained by the retention unit, as second decoded data into which the second encoded data is decoded.

According to the aspect of the present invention, a clock can be highly precisely reproduced.

BRIEF DESCRIPTION OF THE DRAWINGS

FIG. 2A and FIG. 2B are diagrams showing examples of conversion tables relating to the invention;

FIG. 16A and FIG. 16B are flowcharts describing transmission activities to be performed by a transmission system in accordance with the embodiment 2;

DETAILED DESCRIPTION

Overview of the Invention

Figure 1:
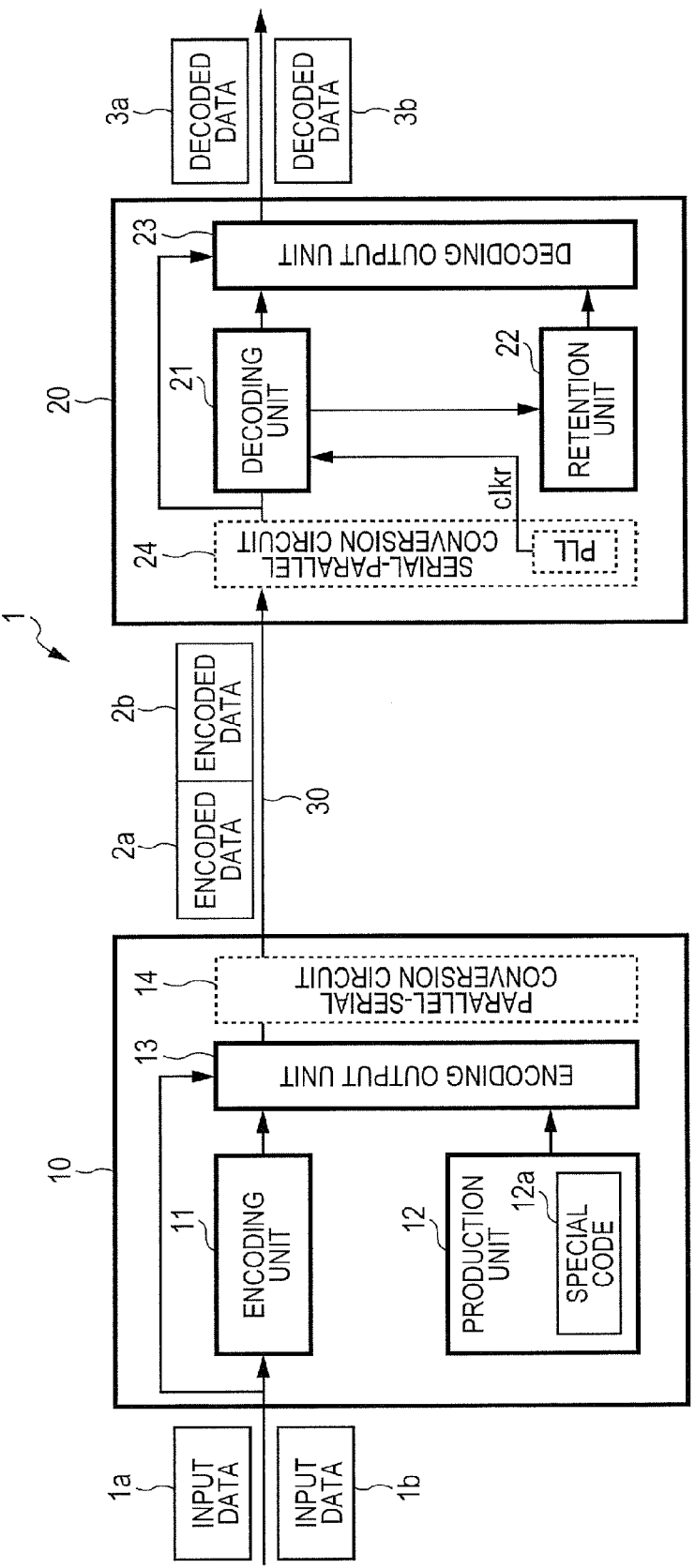
FIG. 1 is a configuration diagram showing major features of a transmission system in accordance with the present invention.

To begin with, the present invention will be outlined in conjunction with FIG. 1. As shown in FIG. 1, a transmission system 1 in accordance with the present invention has an encoder 10 and a decoder 20 coupled to each other over a transmission line 30.

The encoder 10 includes an encoding unit 11, a production unit 12, and an encoding output unit 13 (comparable to a comparator and selection circuit). The encoding unit 11 performs encoding according to a predetermined encoding method that is the clock embedded encoding method. The production unit 12 produces a special code 12a that is not stipulated in the predetermined encoding method but exhibits a higher bit change rate than data produced according to the predetermined encoding method does. Assuming that input data items 1a and 1b that have not been encoded by the encoding unit 11 are identical to each other, the encoding output unit 13 outputs encoded data 2a into which the input data 1a is encoded by the encoding unit 11, and outputs the special code 12a as encoded data 2b, into which the input data 1b is encoded, successively to the encoded data 2a.

The decoder 20 includes a decoding unit 21, a retention unit 22, and a decoding output unit 23 (comparable to a state decision circuit and selection circuit). The decoding unit 21 performs decoding according to a predetermined encoding method that is, similarly to the one employed in the encoder 10, the clock embedded encoding method. The retention unit 22 retains decoded data produced by the decoding unit 21. Assuming that out of the encoded data items 2a and 2b which have not been decoded by the decoding unit 21, the encoded data 2b is the special code 12a, the decoding output unit 23 outputs decoded data 3a into which the encoded data 2a is decoded by the decoding unit 21, and outputs data, which is identical to the decoded data 3a and is retained by the retention unit 22, as decoded data 3b into which the encoded data 2b is decoded.

In the transmission system 1, the input data items 1a and 1b and the decoded data items 3a and 3b are parallel data items, and data passed through the transmission line 30 is serial data. Therefore, in the encoder 10, the encoded data items 2a and 2b outputted from the encoding output unit 13 are parallel-serial-converted, and the resultant serial data is transferred over the transmission line 30. The encoder 10 therefore includes a parallel-serial conversion circuit 14 between the encoding output unit 13 and transmission line 30. In the decoder 20, the serial data inputted over the transmission line 30 is serial-parallel-converted, and the resultant parallel data is inputted to the decoding unit 20 and decoding output unit 23. Therefore, the decoder 20 includes a serial-parallel conversion circuit 24 between the transmission line 30 and the decoding unit 21 and decoding output unit 23. In the transmission system 1, since clock embedded serial data is transmitted, encoding or decoding is performed by adopting as the predetermined encoding method, for example, an mBnB encoding method such as the 4B5B encoding method.

FIG. 2A shows an example of a 4B5B encoding table which the encoding unit 11 uses to perform 4B5B encoding, and FIG. 2B shows an example of a 5B4B decoding table which the decoding unit 21 uses to perform 5B4B decoding.

As shown in FIG. 2A, the encoding table has four bits of parallel data, which has not been encoded, associated with five bits of serial data, which results from encoding, on a one-to-one correspondence basis. In the example shown in FIG. 2A, a bit pattern of five bits long 5B=01101 is assigned to a maximum value of four bits long 4B=1111 (Hex=F) ranked lowest in the table. Therefore, the encoding unit 11 encodes input data items of FFh, FFh, etc., and FFh into 0110101101, 0110101101, etc., and 0110101101.

As shown in FIG. 2B, the decoding table has five bits of serial data, which has not been decoded, associated with four bits of parallel data, which results from decoding, on a one-to-one correspondence basis. The decoding table shown in FIG. 2B is an inversion table with respect to the conversion table shown in FIG. 2B. Each bit pattern of five bits long is decoded into an original bit pattern of four bits long. For example, the decoding unit 21 decodes encoded data items 0110101101, 0110101101, etc., and 0110101101 into FFh, FFh, etc., and FFh.

Figure 3:
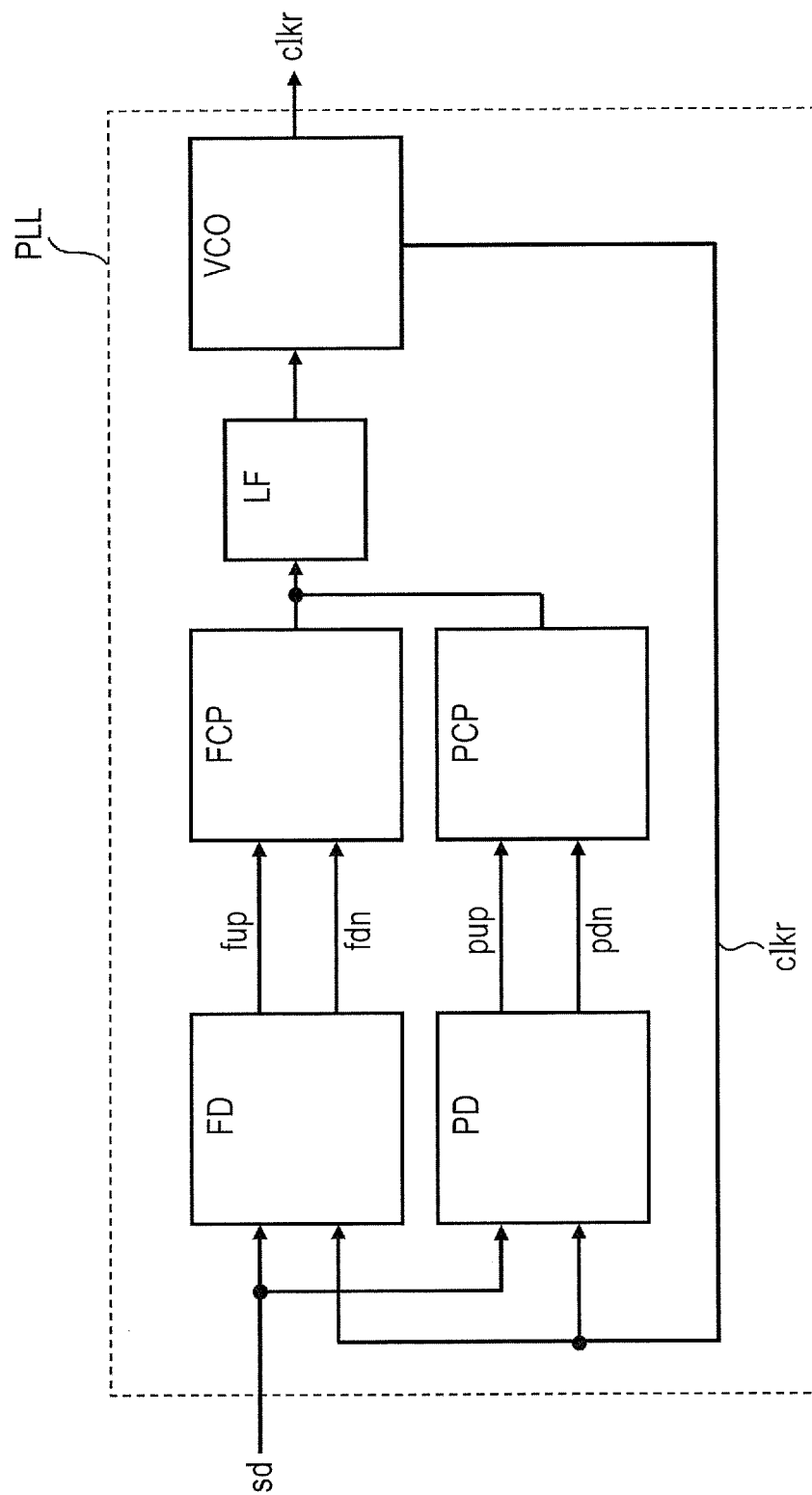
FIG. 3 is a block diagram showing an example of the configuration of a phase-locked loop (PLL) circuit relating to the invention.

The serial-parallel conversion circuit 24 of the decoder 20 includes a phase-locked loop (PLL) circuit as a clock data recovery circuit CDR that reproduces a clock from serial data (encoded data) which is clock embedded data. FIG. 3 shows an example of the configuration of the PLL circuit.

As shown in FIG. 3, the PLL circuit includes a frequency detector (FD), a phase detector (PD), a frequency control charge pump (FCP), a phase control charge pump (PCP), a loop filter (LF), and a voltage controlled oscillator (VCO).

The frequency detector FD inputs serial data sd (encoded data) over the transmission line 30 shown in FIG. 1. The frequency detector FD detects a frequency difference between the inputted serial data ad and a reproduced recovery clock clkr. Namely, the frequency detector extracts clock frequency information from the received serial data sd. The frequency detector FD performs coarse adjustment on the frequency of the recovery clock clkr.

If the frequency of the recovery clock clkr is lower than the frequency of received serial data sd, the frequency detector FD produces a signal fup for raising the frequency of the recovery clock clkr, and outputs the signal to the frequency control charge pump FCP. If the frequency of the recovery clock clkr is higher than the frequency of the received serial data sd, the frequency detector FD produces a signal fdn for lowering the frequency of the recovery clock clkr, and outputs the signal to the frequency control charge pump FCP.

The phase detector PD detects a phase difference between the serial data sd sent from a timing controller and the recovery clock clkr. Namely, the phase detector extracts clock phase information from the received serial data sd. The phase detector PD performs fine adjustment on the frequency of the recovery clock clkr.

If the phase of the recovery clock clkr lags behind the phase of the received serial data sd, the phase detector PD produces a signal pup for advancing the phase of the recovery clock clkr, and outputs the signal to the phase control charge pump PCP. If the phase of the recovery clock clkr leads the phase of the serial data sd, the phase detector PD produces a signal pdn for retarding the phase of the recovery clock clkr, and outputs the signal to the phase control charge pump PCP.

The frequency control charge pump FCP produces an analog current signal from the inputted signal fup or fdn, and outputs the signal to the loop filter LF. Likewise, the phase control charge pump PCP produces an analog current signal from the inputted signal pup or pdn, and outputs the signal to the low filter LF. The loop filter LF produces a control voltage signal on the basis of the analog current signals inputted from the frequency control charge pump FCP and phase control charge pump PCP.

The voltage-controlled oscillator VOC produces a recovery clock clkr having the same frequency as the control voltage signal inputted from the loop filter LF does. The recovery clock clkr is used for decoding by the decoding unit 21, and fed back to the frequency detector FD and phase detector PD alike. The recovery clock clkr is fed to the serial-parallel conversion circuit of the decoder 20.

Specifically, the PLL circuit compares inputted data with the recovery clock clkr produced by the voltage-controlled oscillator VCO incorporated in the PLL circuit, and can thus match the frequency with that of the inputted data.

As a concrete example of activities, if the number of changes in inputted data is larger than that in the recovery clock clkr, the frequency of the voltage-controlled oscillator VCO is recognized as being lower. If the number of changes in the inputted data is smaller than that in the recovery clock clkr, the frequency of the voltage-controlled oscillator VCO is recognized as being higher. Thus, the frequency of the recovery clock clkr is adjusted.

For example, assuming that the PLL circuit produces a clock, which has a double frequency, from input data 0101, if clock data produced by the voltage-controlled oscillator is 00110011, the frequency of the oscillator is identical to the double frequency. The PLL circuit has locked onto the input data. If the clock data of the oscillator is 000111000111, the clock of the oscillator is recognized as being fast, and the frequency of the oscillator is controlled to get lower. If the clock data of the oscillator is 0101, the clock of the oscillator is recognized as being slow, and the frequency of the oscillator is controlled to get higher.

As mentioned above, in a clock embedded type transmission system, the PLL circuit is used to detect change points in a signal and reproduce a clock. Therefore, if a run of bits with the same logic level such as fixed data of 00000 or 11111 is inputted, the PLL circuit cannot lock onto the input signal, and therefore cannot reproduce a clock. Therefore, a 4B5B encoding method like the one seen from FIG. 2A and FIG. 2B is adopted for fear the run of bits with the same level may be inputted.

However, even when the 4B5B encoding method is adopted, reproduction of a clock may be confronted with a problem. Specifically, even when data is encoded according to the 4B5B encoding method, a run of bits with the same logic level may be produced. There is therefore a possibility that the PLL circuit cannot reproduce a clock. If input data has a run of bits that looks like a clock with a different frequency, such as, 00110011, there is a fear that the PLL circuit may track an erroneous frequency (data produced at a double frequency comes to 0000111100001111).

Figure 4:
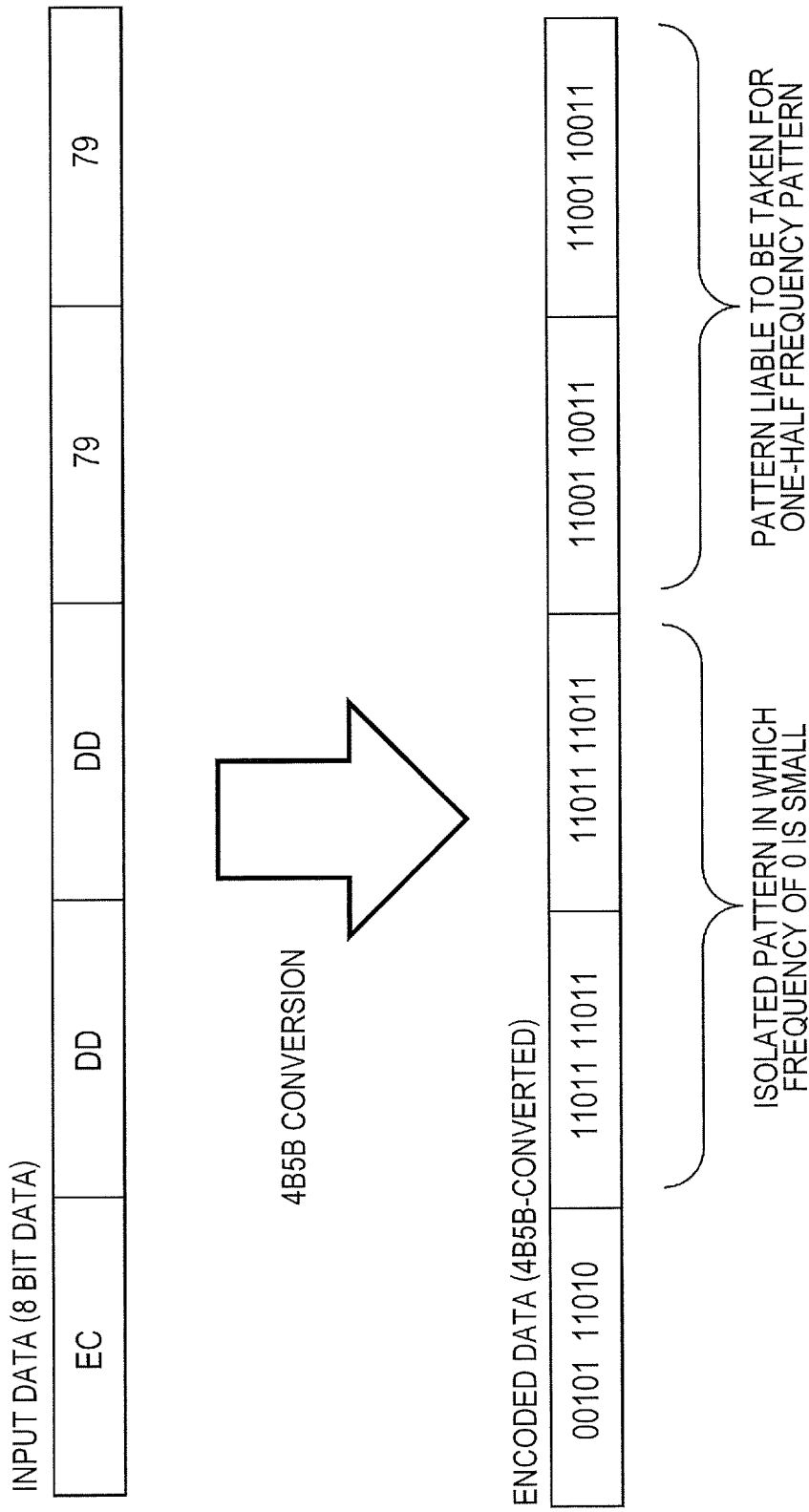
FIG. 4 is an explanatory diagram for use in explaining an object of the invention.

FIG. 4 shows a concrete example of bit patterns that may bring about a problem. FIG. 4 shows an example in which the encoding table shown in FIG. 2A is used to encode input data of eight bits long into encoded data in units of four bits. In FIG. 4, input data items of ECh, DDh, DDh, 79h, and 79h are encoded according to the encoding table.

Herein, DDh is encoded into 11011 11011. Therefore, as shown in FIG. 4, if the input data of DDH is repeated, the encoded data items become 11011 11011 and 11011 11011. In this case, fixed data having a run of four bits with the same level, such as, 1111 is produced, and the frequency of occurrence of 0 is small (this results in an isolated-bit pattern in which 0 is isolated). Therefore, there is a fear that the PLL circuit may not be able to lock onto an input signal so as to produce a clock. The PLL circuit detects a data change from 0 to 1 and a data change from 1 to 0, compares the number of changes with the frequency of the PLL circuit itself, and thus adjusts the frequency of a clock. Therefore, if a change from 0 to 1 or vice versa is rare in the same manner as it is in an isolated-bit pattern, the number of times of adjustment of the clock frequency decreases. As a result, there arises a fear that the PLL circuit fails to lock onto the input signal.

79h is encoded into 11001 10011. Therefore, as shown in FIG. 4, if input data of 79h is repeated, encoded data items become 11001 10011 and 11001 10011. In this case, since 1 and 0 are repeated in units of two bits, the PLL circuit tracks a one-half frequency. Thus, there is a fear that the PLL circuit may track an erroneous frequency.

Further, assuming that the transmission system is a system for transmitting image data, the image data is generally six, eight, or ten bits long, that is, has a length of even-numbered bits. If the image data is mBnB-converted, the image data is, as seen from 4B5B or 6B7B, converted into odd-numbered bits and then transmitted. This is intended to map data into a code, which does not include a run of 0s or 1s, by increasing the number of bits for fear a bit that always represents 0 or 1 may be transferred. The smaller the number of bits to be added at the time of transfer is, the better transfer efficiency is.

At this time, even if a run of odd-numbered bits is included, a signal that looks like another clock is not produced. For example, assuming that data is transferred according to a 4B5B encoding method, when 11001 is repeatedly transferred, 1100111001 ensues. The successive data items do not have a duty cycle of 50% repeated (do not become 11001100 or 111000111000). Therefore, there is no fear that the PLL circuit erroneously identifies another frequency. This is because since transfer data has a length of odd-numbered bits, either the number of 0s or the number of 1s gets larger.

However, as shown in FIG. 4, when the same data is repeated in units of two codes, for example, when 11001 and 100μl come successively, 1100110011 ensues. Thus, the data items look like being produced at a one-half frequency. Further, when 1100110011 is repeated twice, 11001100111100110011 ensues. In this case, logic levels are changed in units of two bits at least. If the frequency of repetition is high, the PLL circuit erroneously identifies the one-half frequency.

If 11001, 10011, 00110, and 01100 are repeated as an example of four repetitive codes, a signal identical to a one-half-frequency clock is produced. The PLL circuit is liable to erroneously identify the one-half frequency.

In the patent document 1, a run of bits with a certain level is suppressed through no-return-to-zero-inverted (NRZx) conversion. If data of 71 (4B5B data of 10101 01010) is repeatedly transferred, 110011001100 ensues. The signal is identical to a one-half-frequency signal. Therefore, the PLL circuit erroneously identifies a one-half frequency, malfunctions, and fails to lock onto an input signal.

In the patent document 2, a sync character is embedded in data, and the sync character is 00000 or 11111. This is intended to identify the timing of a leading bit by utilizing a bit position at which a bit to be transferred changes from a preceding one. According to the method in the patent document 2, if the same data is repeated, it means that a run of 0s is produced. Eventually, the PLL circuit fails to lock onto an input signal.

In the patent document 2, if the sync character is set to a bit string exhibiting a high bit change rate, what is a leading bit cannot be identified. Therefore, the sync character is inevitably a bit string exhibiting a low bit change rate. Eventually, the PLL circuit is liable to fail to lock onto an input signal.

The patent document 2 describes that a reverse of previously sent data is transmitted. Nevertheless, since 0000011111 that is identical to data synchronous with a clock with a one-fifth frequency is inputted, the PLL circuit erroneously identifies the frequency and fails to lock onto an input signal.

In the present invention, as shown in FIG. 1, assuming that the same data is repeatedly inputted to the encoder, a special code exhibiting a high bit change rate (10101 or 01010) is used as encoded data. On receipt of the special code, the decoder copies preceding decoded data so as to achieve decoding. Accordingly, when the same data is repeatedly inputted, the data is replaced with the special code. Any code other than the special code will not be repeatedly transferred. Therefore, generation of a code that is, similarly to the one shown in FIG. 4, liable to cause a malfunction can be diminished, and the bit change rate of encoded data can be raised. Eventually, a clock can be highly precisely reproduced.

First Embodiment

Figure 5:
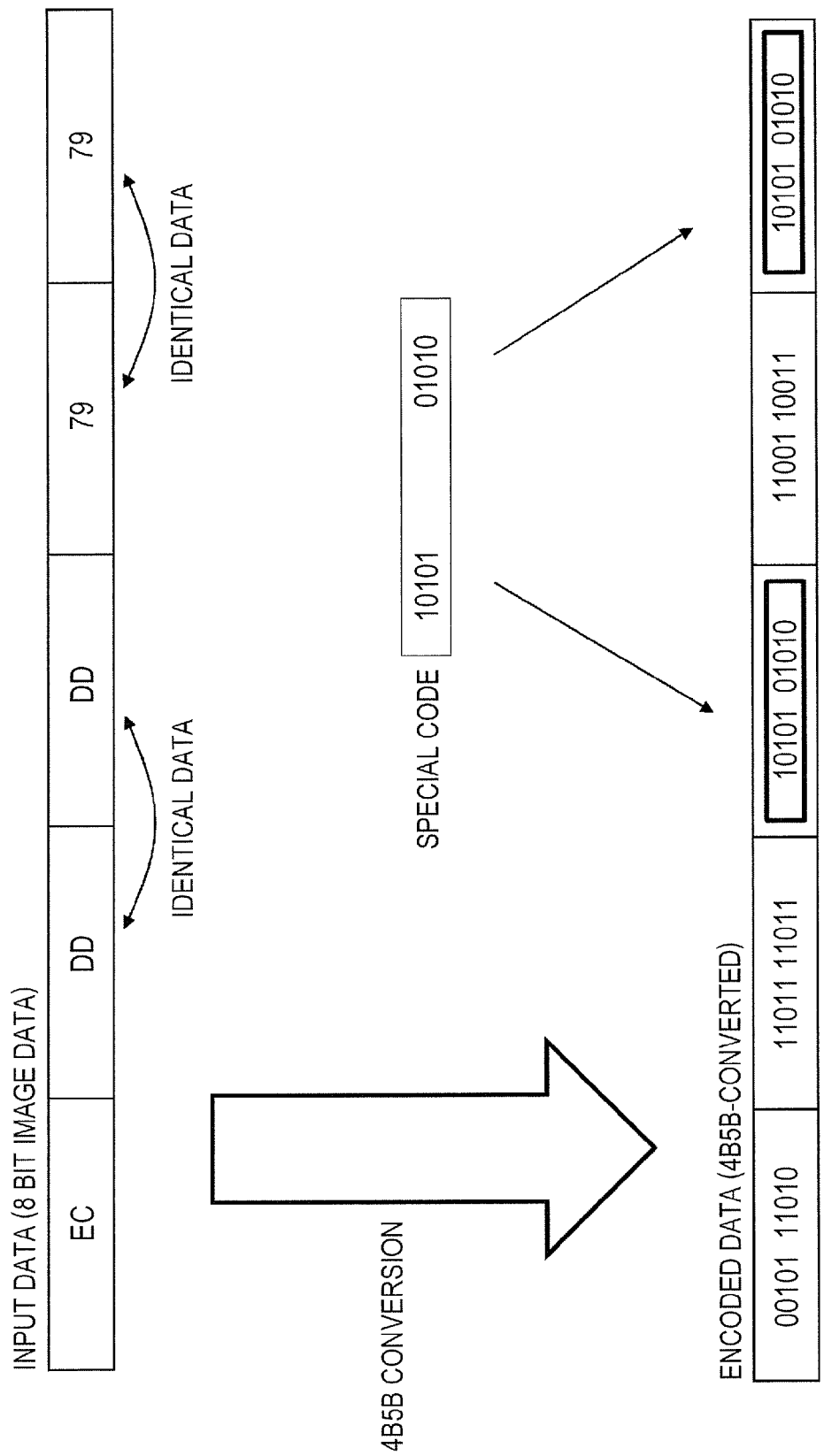
FIG. 5 is an explanatory diagram for use in explaining an encoding method employed in an embodiment 1.

Referring to the drawings, an embodiment 1 will be described below. In the present embodiment, as shown in FIG. 5, when the same data is repeatedly transferred, a special code exhibiting a high bit change rate is transferred as encoded data. When the special code is received, preceding decoded data is copied in units of two codes. Thus, the bit change rate of data to be used at the time of transfer can be raised.

Specifically, as shown in FIG. 5, assuming that one data is ten bits long and the same data is repeatedly inputted, the second repetitive data is encoded into the special code. Five high-order bits of the special code in the present embodiment are 10101, and five low-order bits thereof are 01010. The special code 10101 01010 is a code exhibiting a high bit change rate.

In FIG. 5, input data items of ECh, DDh, DDh, 79h, and 79h are encoded using the encoding table shown in FIG. 2A and the special code. Specifically, the input data DDh is encoded into encoded data of 11011 11011, and the input data 79h is encoded into encoded data of 11001 10011.

Since input data of DDh is repeated, the second DDh is converted into the special code of 10101 01010. Likewise, input data of 79h is repeated, the second 79h is converted into the special code of 10101 01010. Accordingly, the frequency of production of an isolated-bit pattern in which 0 or 1 little appears or a successive-bit pattern including a run of 0s or 1s can be decreased.

Figure 6:
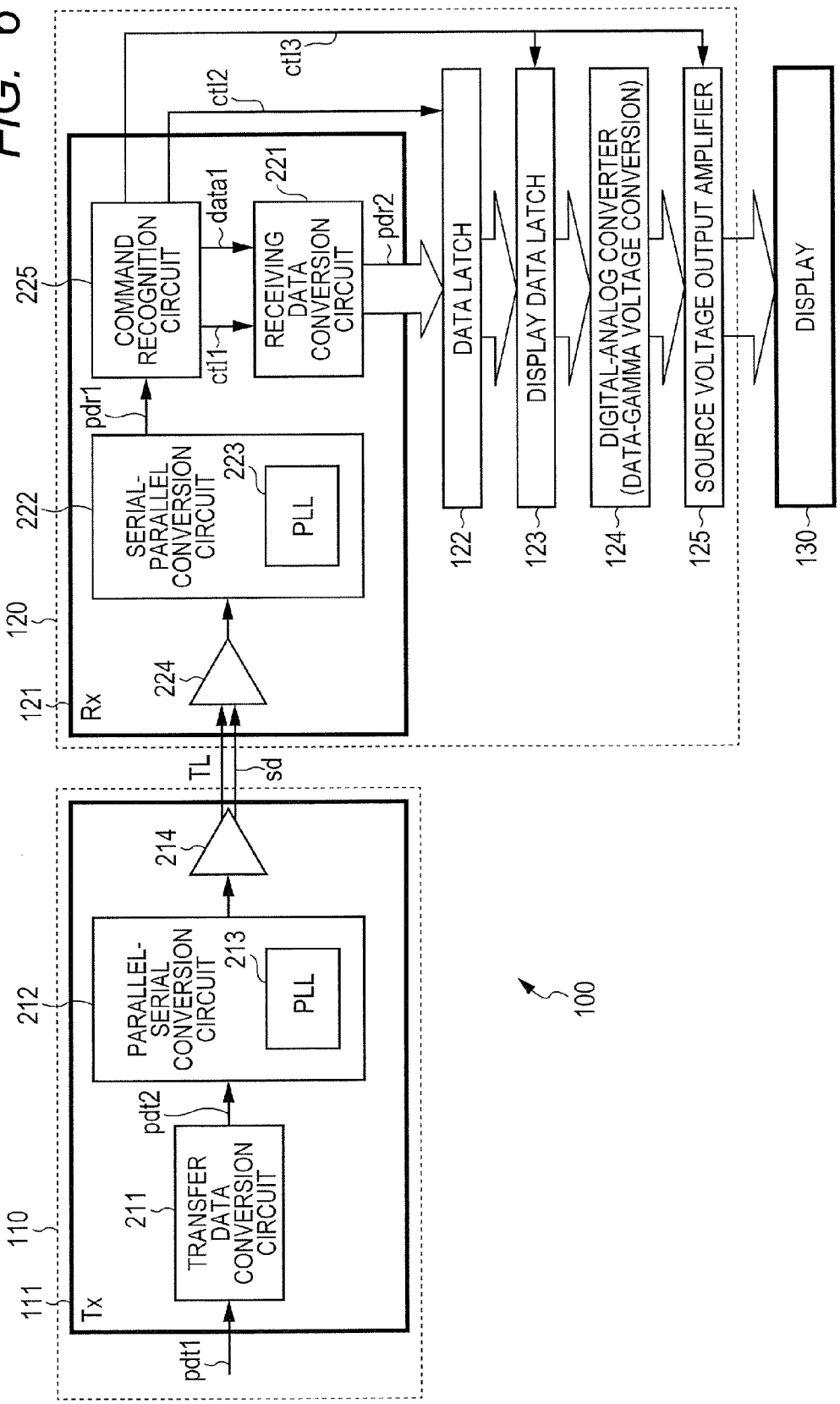
FIG. 6 is a diagram showing the configuration of a transmission system in accordance with the embodiment 1.

Referring to FIG. 6, the configuration of a display device data transmission system 100 in accordance with the present embodiment will be described below. As shown in FIG. 6, the display device data transmission system 100 includes a timing controller 110 that is an image data (display data) transmitting side, a display driver 120 that is an image data receiving side, and a display 130 that displays an image represented by image data. For example, the timing controller 110 and display driver 120 are formed with mutually separate IC chips.

The timing controller 110 includes a data transmission circuit 111 that transmits display data or a command to the display driver 120. The data transmission circuit 111 includes a transfer data conversion circuit 211, a parallel-serial conversion circuit 212, a PLL circuit 213, and a transmission amplifier 214.

The PLL circuit 213 is a clock generation circuit, and feeds a produced clock to the parallel-serial conversion circuit 212. In FIG. 6, the PLL circuit is included in the parallel-serial conversion circuit 212. If necessary, the PLL circuit 213 feeds the clock to the transfer data conversion circuit 211 or any other circuit.

The transfer data conversion circuit 211 is an mBnB encoder, or in this example, a 4B5B encoder. For example, the transfer data conversion circuit 211 performs encoding according to the encoding table like the one shown in FIG. 2A. The transfer data conversion circuit 211 acts synchronously with a clock produced by the PLL circuit 213, 4B5B-encodes inputted parallel image data pdt1 (which may be called input data) so as to produce parallel transmission data pdt2 (which may be called transfer data or encoded data). As described later, the transfer data conversion circuit 211 in the present embodiment performs mBnB encoding. In addition, if the same data repeatedly appears, the transfer data conversion circuit 211 uses a special code to perform the encoding.

The parallel-serial conversion circuit 212 acts synchronously with a clock produced by the PLL circuit 213, and converts parallel transmission data pdt1, which is produced by the transfer data conversion circuit 211, into serial data sd. The serial data sd is outputted over the transmission line TL via the transmission amplifier 214.

The display driver 120 includes a data receiving circuit 121, a data latch 122, a display data latch 123, a digital-analog converter (DAC) 124, and a source voltage output amplifier 125. The data receiving circuit 121 includes a receiving data conversion circuit 221, a serial-parallel conversion circuit 222, a PLL circuit 223, a receiving amplifier 224, and a command identification circuit 225.

The serial data sd sent from the timing controller 110 is fed to each of the serial-parallel conversion circuit 222 and PLL circuit 223 via the receiving amplifier 224 over the transmission line TL.

The PLL circuit 223 is a clock data recovery circuit (clock reproduction circuit), and has, for example, the same circuitry as that shown in FIG. 3. The PLL circuit 223 reproduces a recovery clock from the received serial data sd, and feeds the reproduced recovery clock to the serial-parallel conversion circuit 222. In FIG. 6, the PLL circuit 223 is included in the serial-parallel conversion circuit 222. If necessary, the PLL circuit 223 feeds the recovery clock to the receiving conversion circuit 221 or command identification circuit 225.

The serial-parallel conversion circuit 222 acts synchronously with the recovery clock produced by the PLL circuit 223, and converts the serial data sd into parallel receiving data pdr1.

The command identification circuit 225 acts synchronously with the recovery clock produced by the PLL circuit 223, and identifies a command included in the parallel receiving data pdr1 produced by the serial-parallel conversion circuit 222. The command identification circuit 225 outputs a control signal ctl1, ctl2, or ctl3 to the data latch 122, display data latch 123, or source voltage output amplifier 125. The command identification circuit 225 outputs a blanking control signal, which indicates the timing of a blanking period, as the control signal ctl1 to the receiving data conversion circuit 221.

The command identification circuit 225 outputs a data start signal, which indicates the timing of the beginning of data, as the control signal ctl2 to the data latch 122. The command identification circuit 225 outputs an output timing signal, which indicates output timing, or a polarity control signal, with which polarity is controlled, as the control signal ctl3 to the display data latch 123 or source voltage output amplifier 125.

The receiving data conversion circuit 221 is an nBmB decoder, or in this example, a 5B4B decoder. For example, the receiving data conversion circuit 221 performs decoding according to the decoding table like the one shown in FIG. 2B. The receiving data conversion circuit 221 acts synchronously with a recovery clock produced by the PLL circuit 223, 5B4B-decodes parallel image data data1 which is included in receiving data (transfer data outputted from the transfer data conversion circuit 211), and outputs parallel image data pdr2 (which may be called image data or display data) to the data latch 122.

The receiving data conversion circuit 221 decides a blanking period and display period on the basis of a blanking control signal, and performs decoding. As described later, the receiving data conversion circuit 221 relating to the present embodiment performs nBmB decoding. If a special code is included in data, the receiving data conversion circuit 221 uses immediately preceding decoded data to perform decoding.

The data latch 122 latches the parallel image data pdr2 decoded by the receiving data conversion circuit 221. The data latch 122 begins latching data in response to the data start signal sent from the command identification circuit 225.

The display data latch 123 latches the image data, which is latched by the data latch 122, according to the output timing signal sent from the command identification circuit 225, and outputs the data to the DAC 124. The DAC 124 converts image data, which is a digital signal outputted from the display data latch 123, into an analog voltage signal (gamma voltage).

The source voltage output amplifier 125 includes plural amplifiers (not shown) associated with plural source lines led to thin film transistors (TFTs) disposed in a matrix manner in the display 130. The source voltage output amplifier 125 produces a gray-scale voltage by amplifying the analog voltage signal produced by the DAC 124, and outputs the gray-scale voltage onto any of the source lines in the display 130. The source voltage output amplifier 125 reverses polarities in response to the polarity control signal sent from the command identification circuit 225.

The display 130 is, for example, a liquid crystal display panel. The display 130 includes, as already known, numerous pixels disposed in the matrix manner, though the pixels are not shown in FIG. 6. Each of the pixels includes a TFT as a switching element. The TFT is located at an intersection between each of the plural source lines extended in a vertical direction, and each of gate lines extended in a lateral direction.

Figure 7:
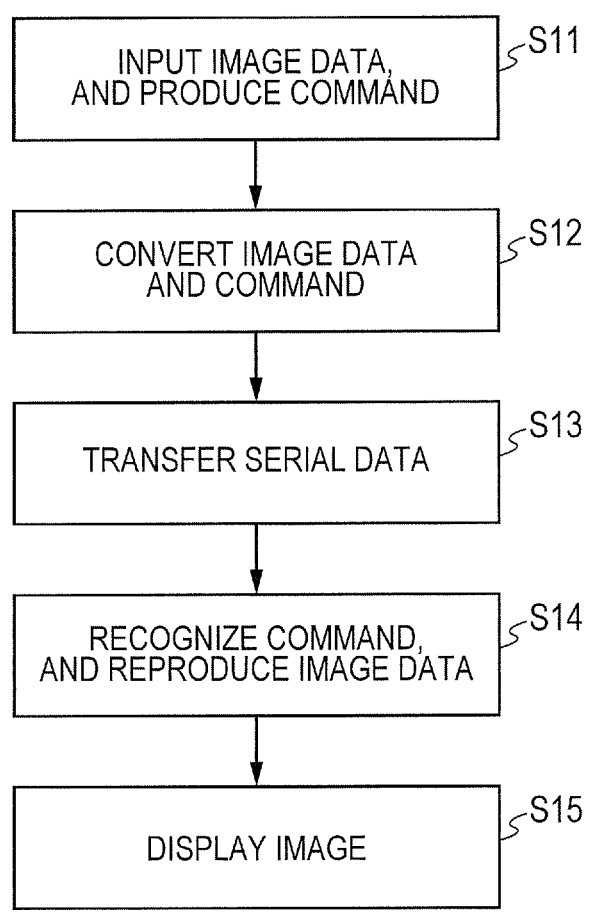
FIG. 7 is a flowchart describing display activities performed by the transmission system in accordance with the embodiment 1.

Next, referring to FIG. 7, image display activities to be performed in the display device data transmission system 100 in accordance with the present embodiment will be described below. FIG. 7 describes activities to be performed until an image is displayed on the display 130 after image data is inputted to the timing controller 110.

To begin with, image data is inputted to the timing controller 110, and a command necessary to display the image data is produced (S11). For example, aside from the image data, a sync signal or the like is inputted to the timing controller 110. The timing controller 110 produces a command, with which an amplifier output period in the display driver 120 or a data beginning timing is controlled, on the basis of the sync signal or the like. The command is produced so that after data begins, the same number of image data items as the number of output amplifiers included in the display driver is transmitted, and the transmission is succeeded by a blanking period. For example, data including the image data and commands becomes transfer data to be transferred to the display driver 120.

Thereafter, the timing controller 110 performs 4B5B-encoding or conversion so as to transmit the image data and command as transfer data (S12). The transfer data conversion circuit 211 of the timing controller 110 encodes the image data into a 4B5B code. If the same data is repeated, the transfer data conversion circuit 211 uses a special code (copy command) to perform encoding. The transfer data conversion circuit 211 transfers the command without any change or transfers the command after encoding it.

Thereafter, serial data is transferred from the timing controller 110 to the display driver 120 (S13). The parallel-serial conversion circuit 212 of the timing controller 110 converts parallel transfer data, which is produced by the transfer data conversion circuit 211, into serial data, and transfers the serial data over the transmission line TL. Further, in the display driver 120, the PLL circuit 223 produces a clock on the basis of the transferred serial data, and the serial-parallel conversion circuit 222 converts the serial data into parallel data.

Thereafter, the display driver 120 identifies the command and reproduces the image data (S15). The command identification circuit 225 of the display driver 120 analyzes the command included in the parallel receiving data, identifies the data beginning timing, image data, and special code (copy command), and amplifier output period for the display driver, and outputs a signal to each block. The command identification circuit 225 recognizes a period, which begins with a data start signal and during which the number of source amplifiers can be counted, as a display period and the other period as a blanking period, and outputs a blanking period signal to the receiving data conversion circuit 221. The receiving data conversion circuit 221 receives the blanking period signal, image data, and special code (copy command), converts them into image data, and transfers the image data to the data latch 122.

Thereafter, the display driver 120 drives the source lines in the display 130, and an image is displayed (S16). On receipt of the data start signal, the data latch 122 of the display driver 120 begins latching data. At the display output timing, the data of the data latch 122 is transferred to the display data latch 123, and converted into a voltage by the DAC 124. A desired voltage is fed from the source voltage output amplifier 125 to the display 130. The image is then displayed on the display 130.

Figure 8:
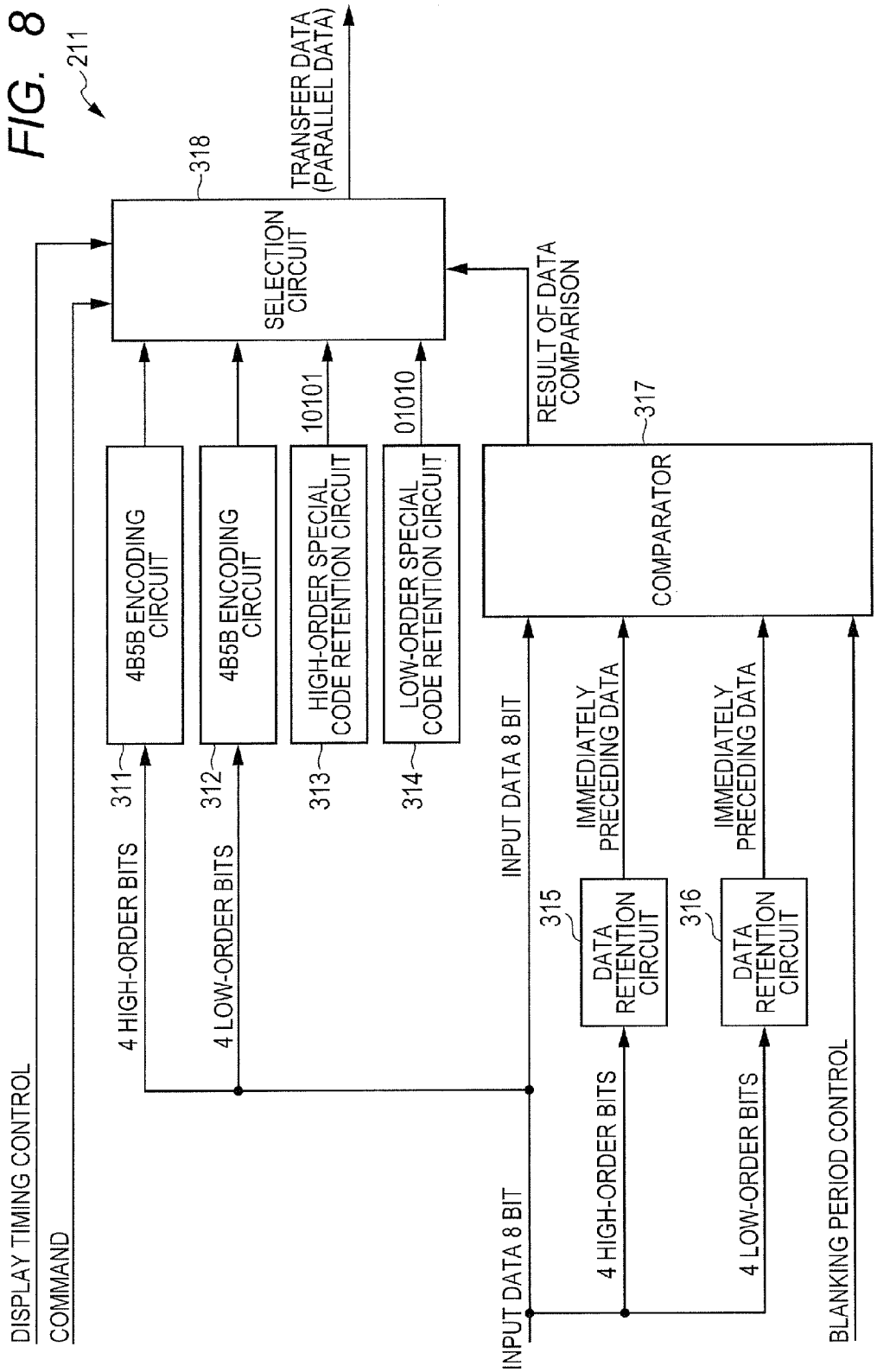
FIG. 8 is a block diagram showing the configuration of a transfer data conversion circuit relating to the embodiment 1.

Next, the configuration of the transfer data conversion circuit 211 relating to the present embodiment will be described below in conjunction with FIG. 8. As shown in FIG. 8, the transfer data conversion circuit 211 includes 4B5B encoding circuits 311 and 312, a high-order special code retention circuit 313, a low-order special code retention circuit 314, data retention circuits 315 and 316, a comparator 317, and a selection circuit 318.

The 4B5B encoding circuits 311 and 312 are examples of an mBnB encoding circuit that performs mBnB encoding on input data. The 4B5B encoding circuit 311 encodes four high-order bits, and the 4B5B encoding circuit 312 encodes four low-order bits. Accordingly, image data of eight bits long can be processed in units of four bits or two codes. By performing 4B5B encoding, compared with 8B10B encoding, the size of the encoding table can be decreased.

Specifically, the 4B5B encoding circuit 311 inputs four high-order bits of input data of eight bits long, and outputs encoded data of five bits long, into which the four high-order bits are 4B5B-encoded, to the selection circuit 318. The 4B5B encoding circuit 312 inputs four low-order bits of the input data of eight bits long, and outputs encoded data of five bits long, into which the four low-order bits are 4B5B-encoded, to the selection circuit 318.

The high-order special code retention circuit 313 and low-order special code retention circuit 314 are circuits for retaining a special code, and can be said to be circuits that produce the special code and feed the code to the selection circuit 318. The special code is a code that is not stipulated in the mBnB encoding method, that is, a code that is not defined in the encoding table and decoding table shown in FIG. 2A and FIG. 2B respectively in the case of 4B5B encoding, so that the special code can be discriminated from the other codes. Further, the special code is a code, which exhibits a high bit change rate, so that a clock can be highly precisely reproduced. In particular, assuming that the special codes are concatenated (successively produced), the bit change rate in adjoining bits (the most significant bit of one of the codes and the least significant bit of the other code) and nearby bits of the codes is high. In other words, the bit change rate encompasses a change rate in several bits including the adjoining bits.

In this example, the high-order special code retention circuit 313 that retains high-order bits of the special code, and the low-order special code retention circuit 314 that retains low-order bits of the special code are included in association with the 4B5B encoding circuits 311 and 312. Specifically, the high-order special code retention circuit 313 retains a high-order special code to be used to convert four high-order bits of input data of eight bits long, and feeds the high-order special code to the selection circuit 318. The high-order special code is a code of five bits long in association with five bits into which four high-order bits are encoded. In this example, the high-order special code is 10101. The low-order special code retention circuit 314 retains a low-order special code to be used to convert four low-order bits of the input data of eight bits long, and feeds the low-order special code to the selection circuit 318. The low-order special code is a code of five bits long in association with five bits into which the four low-order bits are encoded. In this example, the low-order special code is 01010.

The data retention circuits 315 and 316 are circuits that retain input data, which is inputted at immediately preceding timing (input data that is an object of encoding at the immediately preceding timing), so as to detect a run of identical input data items. In this example, the data retention circuit 315 that retains four high-order bits of input data, and the data retention circuit 316 that retains four low-order bits of the input data are included in association with the 4B5B encoding circuits 311 and 312. Specifically, the data retention circuit 315 retains the four high-order bits of the input data that is inputted at the timing of an initial clock, and outputs the retained four high-order bits to the comparator 317 at the timing of a subsequent clock. The data retention circuit 316 retains the four low-order bits of the input data that is inputted at the timing of the initial clock, and outputs the retained four low-order bits to the comparator 317 at the timing of the subsequent clock.

The comparator 317 compares current input data with immediately preceding input data retained by the data retention circuits 315 and 316 to see if the current input data is identical to the immediately preceding input data, and outputs the result of the comparison to the selection circuit 318. The comparator 317 compares the four high-order bits of the input data with the four bits in the data retention circuit 315, and outputs the result of the comparison. The comparator 317 compares the four low-order bits of the input data with the four bits in the data retention circuit 316, and outputs the result of the comparison. In addition, the comparator 317 inputs a blanking period control signal. During the blanking period, the comparator 317 does not act for comparison. During the display period other than the blanking period, the comparator 317 acts for comparison.

The selection circuit 318 selects encoded data, which is produced by the 4B5B encoding circuits 311 and 312, or the special code, which is retained by the high-order special code retention circuit 313 and low-order special code retention circuit 314, on the basis of the result of the comparison performed by the comparator 317, and outputs the encoded data or special code as transfer data.

If the result of the comparison performed by the comparator 317 demonstrates that the four high-order bits of the current input data are different from the four high-order bits of the immediately preceding input data, the selection circuit 318 outputs encoded data produced by the 4B5B encoding circuit 311. If the four high-order bits of the current input data are identical to the four high-order bits of the immediately preceding input data, the selection circuit 318 outputs the high-order special code retained by the high-order special code retention circuit 313.

If the result of the comparison performed by the comparator 317 demonstrates that the four low-order bits of the current input data are different from the four low-order bits of the immediately preceding input data, the selection circuit 318 outputs encoded data produced by the 4B5B encoding circuit 312. If the four low-order bits of the current input data are identical to the four low-order bits of the immediately preceding input data, the selection circuit 318 outputs the low-order special code of the low-order special code retention circuit 314. The selection circuit 318 inputs a display timing control signal or command, selects the command or the like, and outputs the command or the like as transfer data.

Figure 9:
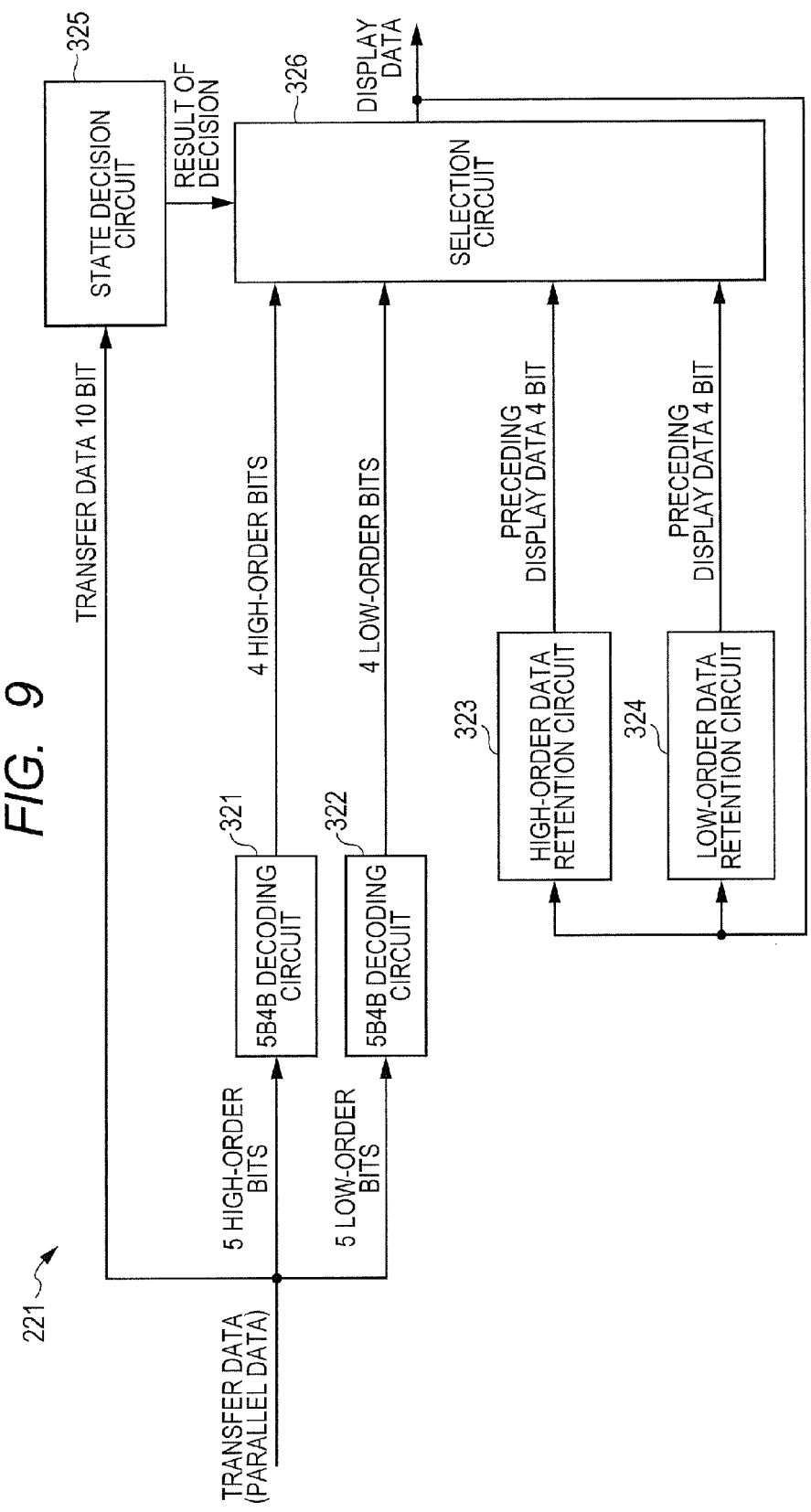
FIG. 9 is a block diagram showing the configuration of a receiving data conversion circuit relating to the embodiment 1.

Next, referring to FIG. 9, the configuration of the receiving data conversion circuit 221 relating to the present embodiment will be described below. As shown in FIG. 9, the receiving data conversion circuit 221 includes 5B4B decoding circuits 321 and 322, a high-order data retention circuit 323, a low-order data retention circuit 324, a state decision circuit 325, and a selection circuit 326.

The 5B4B decoding circuits 321 and 322 are examples of an mBnB decoding circuit that performs nBmB decoding on transfer data. The 5B4B decoding circuit 321 decodes five high-order bits, and the 5B4B decoding circuit 322 decodes five low-order bits. Accordingly, the transfer data of ten bits long can be processed in units of five bits or two codes. By performing 5B4B decoding, compared with 10B8B decoding, the size of the decoding table can be decreased.

Specifically, the 5B4B decoding circuit 321 inputs five high-order bits of transfer data of ten bits long, and outputs decoded data of four bits long, into which the five high-order bits are 5B4B-decoded (four high-order bits of image data), to the selection circuit 326. The 5B4B decoding circuit 322 inputs five low-order bits of the input data of ten bits long, and outputs decoded data of four bits long, into which the five low-order bits are 5B4B-decoded (four low-order bits of image data), to the selection circuit 326.

The high-order data retention circuit 323 and low-order data retention circuit 324 are circuits that retain decoded data (display data), which is produced at immediately preceding timing, for the purpose of performing decoding in case the special code is received. In this example, the high-order data retention circuit 323 that retains the four high-order bits of the decoded data, and the low-order data retention circuit 324 that retains the four low-order bits of the decoded data are included in association with the 5B4B decoding circuits 321 and 322 respectively. Specifically, the high-order data retention circuit 323 retains the four high-order bits of the decoded data, which is produced at the timing of an initial clock, and outputs the retained four high-order bits to the selection circuit 326 at the timing of a subsequent clock. The low-order data retention circuit 324 retains the four low-order bits of the decoded data, which is produced at the timing of the initial clock, and outputs the retained four low-order bits to the selection circuit 326 at the timing of the subsequent clock.

In case the special code is inputted as transfer data, if the high-order data retention circuit 323 and low-order data retention circuit 324 are controlled so as not to update the retained bits, low power consumption can be attained more reliably than it can when the retained bits are updated every time.

The state decision circuit 325 inputs transfer data (ten bits long), decides a state, in which decoding is performed, on the basis of the transfer data, and outputs the result of the decision to the selection circuit 326. The state decision circuit 325 decides whether the transfer data is the special code, and outputs the result of the decision. If the transfer data includes the data start signal, the state decision circuit 325 recognizes a certain period, which begins with the data start signal, as a display period, and outputs the result of the recognition.

Based on the result of the decision made by the state decision circuit 325, the selection circuit 326 selects the decoded data produced by the 5B4B decoding circuits 321 and 322 or the decoded data retained by the high-order data retention circuit 323 and low-order data retention circuit 324, and outputs the selected data as display data.

If the result of the decision made by the state decision circuit 325 demonstrates that the transfer data is not the special code, the selection circuit 326 outputs the decoded data produced by the 5B4B decoding circuit 321 and 322. If the transfer data is the special data, the selection circuit 326 outputs the immediately preceding decoded data retained by the high-order data retention circuit 323 and low-order data retention circuit 324. If the result of the recognition performed by the state decision circuit 325 demonstrates that the display period has begun, the selection circuit 326 outputs the decoded data produced by the 5B4B decoding circuits 321 and 322 or the decoded data retained by the high-order data retention circuit 323 and low-order data retention circuit 324.

Next, referring to FIG. 10 to FIG. 12B, activities of the data transmission circuit 111 of the timing controller 110 and the data receiving circuit 121 of the display driver 120, which relate to the present embodiment, will be described below.

Figure 10:
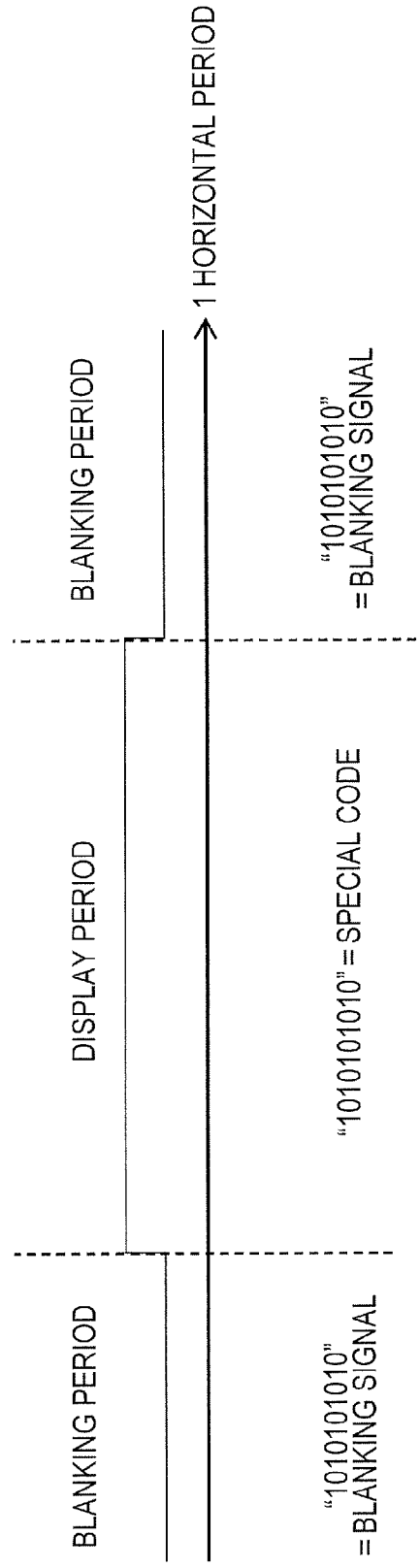
FIG. 10 is a timing chart showing a display period in the transmission system in accordance with the embodiment 1.
Figure 11:
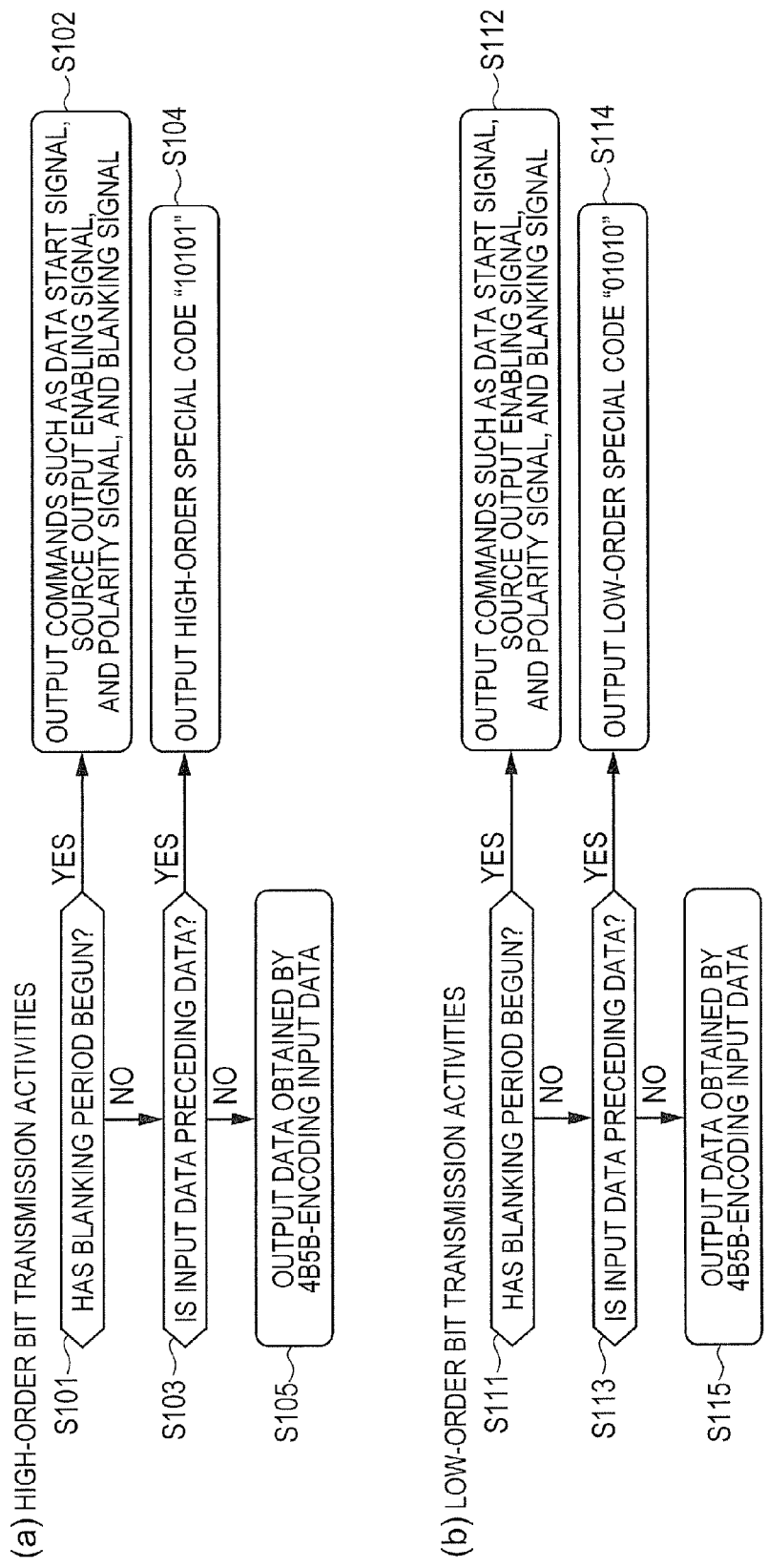
FIG. 11A and FIG. 11B are flowcharts describing transmission activities to be performed by the transmission system in accordance with the embodiment 1.
Figure 12:
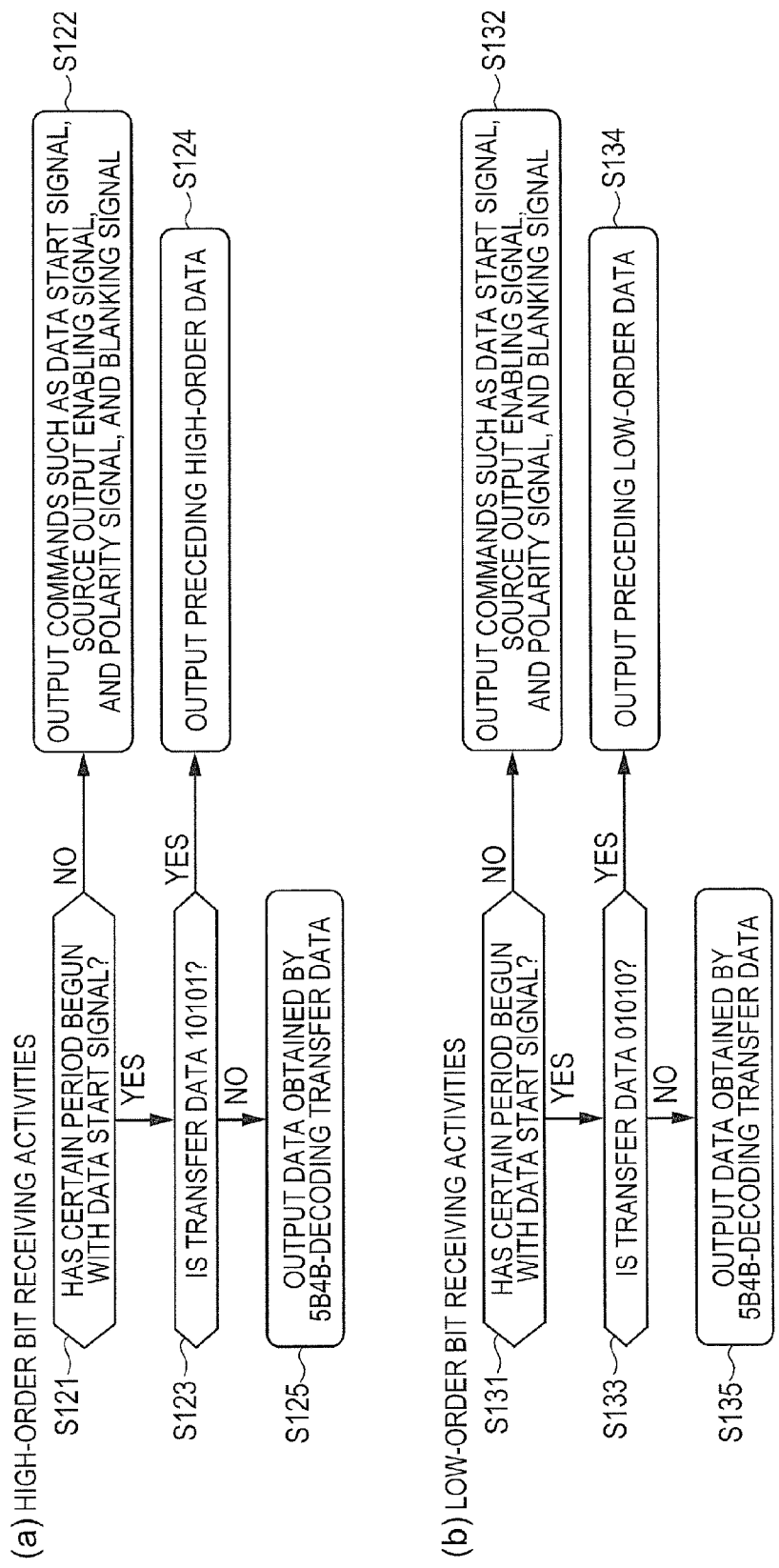
FIG. 12A and FIG. 12B are flowcharts describing receiving activities to be performed by the transmission system in accordance with the embodiment 1.

FIG. 10 shows display timing of display data in the present embodiment. In the display 130, display pixels on one line are driven during every horizontal period in order to achieve display. During one horizontal period, a blanking period during which display is not achieved is succeeded by a display period during which display data is displayed, and the display period is then succeeded by the blanking period. In the present embodiment, only during the display period, encoding and decoding using the special code is carried out. Accordingly, the special code is not unnecessarily employed.

During the blanking period, a blanking signal is transmitted from the timing controller 110 to the display driver 120. The blanking signal is 1010101010. In the present embodiment, if the same data is repeated during the display period, the special code is transmitted from the timing controller 110 to the display driver 120. In this example, the special code shall be identical to the blanking signal or be 1010101010. Accordingly, unnecessary assignment of a code can be prevented, and the code that exhibits a high bit change rate and is used as the blanking signal can be used as the special code. Any other code may be assigned to the special code, or a code different from the blanking signal may be assigned thereto.

FIG. 11A shows transmission processing for high-order bits in the data transmission circuit 111 including the transfer data conversion circuit 211 shown in FIG. 8, and FIG. 11B shows transmission processing for low-order bits.

As shown in FIG. 11A, in transmission processing for high-order bits, the transfer data conversion circuit 211 first decides whether the blanking period has begun (S101). The transfer data conversion circuit 211 makes a decision according to an inputted blanking period control signal. If the blanking period has begun, the data start signal, source output enabling signal (output timing signal), polarity signal, and blanking signal are outputted from the selection circuit 318 (S102). At this time, the high-order bits 10101 of the blanking signal are outputted.

If the blanking period is found at S101 not to have begun, that is, if the display period has begun, the transfer data conversion circuit 211 decides whether the four high-order bits of input data are identical to the four high-order bits of immediately preceding input data (S103). If the comparison performed by the comparator 317 of the transfer data conversion circuit 211 demonstrates that the four high-order bits of the input data are identical to the four high-order bits of the immediately preceding input data, that is, the same data is repeated, the selection circuit 318 outputs the high-order special code 10101 that corresponds to the five high-order bits of the special code (S104).

If the comparison performed by the comparator 317 of the transfer data conversion circuit 211 demonstrates at S103 that the four high-order bits of the input data are different from the four high-order bits of the immediately preceding input data, the selection circuit 318 outputs encoded data into which the four high-order bits of the input data are 4B5B-encoded (S105).

As shown in FIG. 11B, in transmission processing for low-order bits, the transfer data conversion circuit 211 decodes whether the blanking period has begun (S111). The transfer data conversion circuit 211 makes a decision according to an inputted blanking period control signal. If the blanking period has begun, the data start signal, source output enabling signal (output timing signal), polarity signal, and blanking signal are outputted from the selection circuit 318 (S112). At this time, the low-order bits 01010 of the blanking signal are outputted.

If the blanking period is found at S111 not to have begun, that is, the display period has begun, the transfer data conversion circuit 211 decides whether the four low-order bits of the input data are identical to the four low-order bits of the immediately preceding input data (S113). The comparison performed by the comparator 317 of the transfer data conversion circuit 211 demonstrates that the four low-order bits of the input data are identical to the four low-order bits of the immediately preceding input data, that is, the same data is repeated, the selection circuit 318 outputs the low-order special code 01010 that corresponds to the five low-order bits of the special code (S114).

If the comparison performed by the comparator 317 of the transfer data conversion circuit 211 demonstrates at S113 that the four low-order bits of the input data are different from the four low-order bits of the immediately preceding input data, the selection circuit 318 outputs the encoded data into which the four low-order bits of the input data are 4B5B-encoded (S115).

FIG. 12A describes receiving processing for high-order bits in the data receiving circuit 121 that includes the receiving data conversion circuit 221 shown in FIG. 9, and FIG. 12B describes receiving processing for low-order bits.

As mentioned in FIG. 12A, in receiving processing for high-order bits, the receiving data conversion circuit 221 first decides whether a certain period has begun with the data start signal (S121). After receiving the data start signal, the receiving data conversion circuit 221 recognizes data, which is outputted from the display driver, as display data, and recognizes the other as a blanking signal. Accordingly, the display period or blanking period can be identified only with the data start signal. If the state decision circuit 325 of the receiving data conversion circuit 221 decides that the certain period has not begun with the data start signal, that is, the blanking period has begun, the data start signal, source output enabling signal (output timing signal), polarity signal, and blanking signal are outputted (S122). These control signals may be outputted from the command identification circuit 225 to the respective blocks, or from the receiving data conversion circuit 221 to the respective blocks.

If the state decision circuit 325 of the receiving data conversion circuit 221 decides at S121 that the certain period has begun with the data start signal, that is, the display period has begun, whether the five high-order bits of the transfer data correspond to the high-order special code 10101 is decided (S123). If the state decision circuit 325 decides that the five high-order bits of the transfer data correspond to the high-order special code, the selection circuit 326 outputs the four high-order bits of the immediately preceding decoded data (S124).

If the state decision circuit 325 of the receiving data conversion circuit 221 decides at S123 that the five high-order bits of the transfer data do not correspond to the high-order special code, the selection circuit 326 outputs the decoded data into which the five high-order bits of the transfer data are 5B4B-decoded (S125).

As mentioned in FIG. 12B, in receiving processing for low-order bits, the receiving data conversion circuit 221 first decides whether a certain period has begun with the data start signal (S131). After receiving the data start signal, the receiving data conversion circuit 221 recognizes the data outputted from the display driver as display data, and recognizes the other as a blanking signal. If the state decision circuit 325 of the receiving data conversion circuit 221 decides that the certain period has not begun with the data start signal, that is, the blanking period has begun, the data start signal, source output enabling signal (output timing signal), polarity signal, and blanking signal are outputted (S132).

If the state decision circuit 325 of the receiving data conversion circuit 221 decides at S131 that the certain period has begun with the data start signal, that is, the display period has begun, whether the five low-order bits of the transfer data correspond to the low-order special code 01010 (S133). If the state decision circuit 325 decides that the five low-order bits of the transfer data correspond to the low-order special code, the selection circuit 326 outputs the four low-order bits of the immediately preceding decoded data (S134).

If the state decision circuit 325 of the receiving data conversion circuit 221 decides at S133 that the five low-order bits of the transfer data do not correspond to the low-order special code, the selection circuit 326 outputs the decoded data into which the five low-order bits of the transfer data are 5B4B-decoded (S135).

As mentioned above, in the present embodiment, if the same data is repeatedly inputted in units of two codes, the second data is converted into the special code. Accordingly, as shown in FIG. 4, a pattern including a run of bits with the same value or a pattern causing erroneous identification of a frequency can be prevented from being repeatedly produced.

The five high-order bits of the special code are set to 10101, and the five low-order bits of the special code are set to 01010. Since the special code become 10101 01010, the special code can be said to be data exhibiting a high bit change rate. For transfer, since the five high-order bits and five low-order bits are separate data items, the bit change rate gets higher. If 10101 alone is adopted, the special code becomes 10101 10101 to thus have successive 1s. Therefore, repetition of successive-bit data whose duty cycle is 50% can be diminished, and transfer of data with a high bit change rate can be achieved. Eventually, stable fast transfer can be achieved.

In the present embodiment, if a signal with a high bit change rate such as 0101010101 is frequently inputted, occurrence of a lock-on failure can be diminished, and erroneous identification of a frequency can be suppressed.

Specifically, when the aforesaid configurations and activities are adopted, data other than the special code will not be repeatedly transferred. Therefore, the PLL circuit on the receiving side can receive an edge at any of various bit positions, and hardly fails to lock onto an input signal. In addition, since a signal that looks like a clock with a different frequency, such as, 1100110011 hardly appears, a probability that the frequency is erroneously detected decreases. Therefore, the PLL circuit hardly fails to lock onto the input signal, and a transfer frequency can be further raised.

Even when the same code is employed, a command to be carried by the code can be changed, that is, the code can be regarded as a blanking signal during a blanking period and regarded as a special code during a display period. Therefore, assignment of an unnecessary code can be prevented.

Second Embodiment

Figure 13:
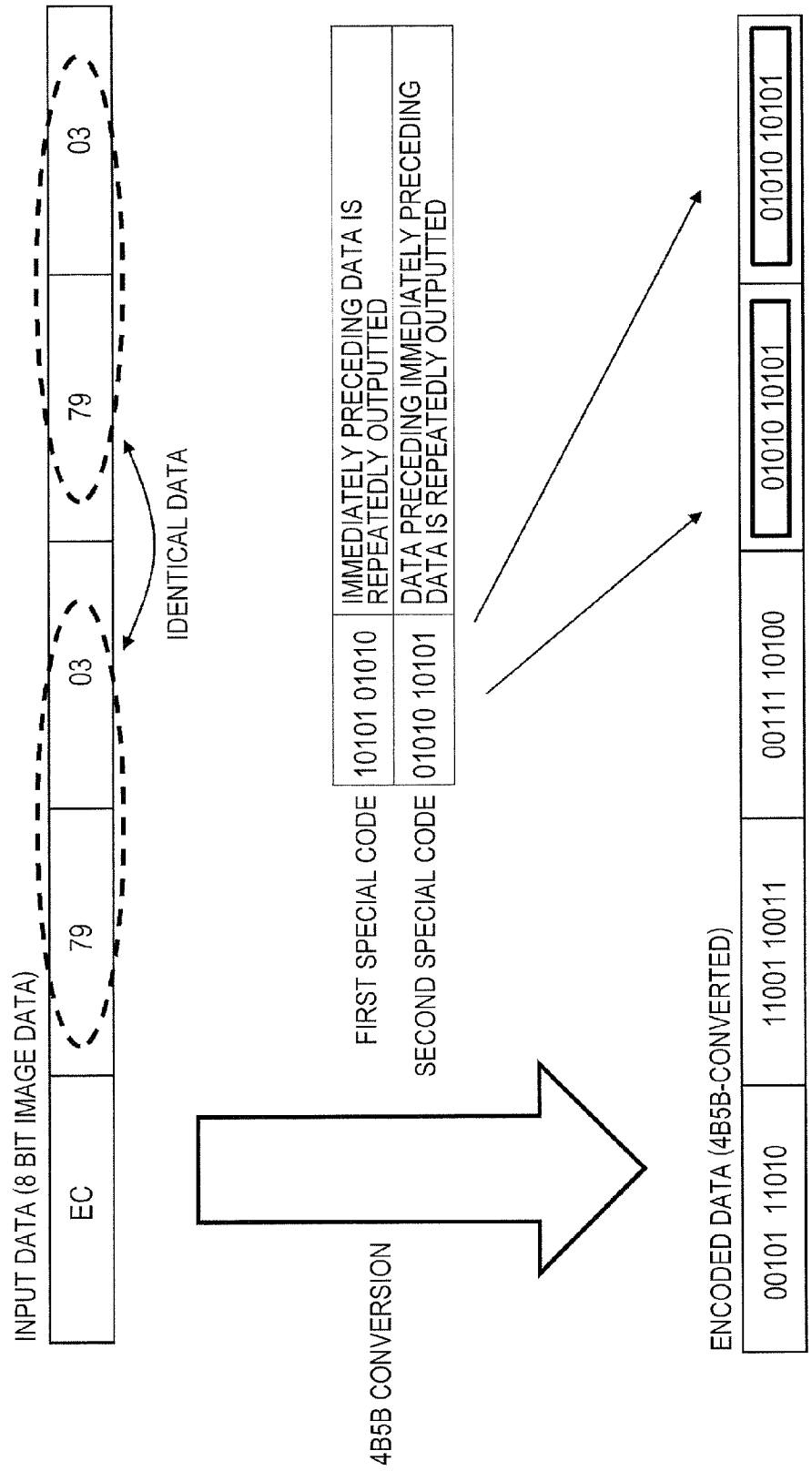
FIG. 13 is an explanatory diagram for use in explaining an encoding method employed in an embodiment 2.

Referring to the drawings, an embodiment 2 will be described below. A major feature of the present embodiment is that, as shown in FIG. 13, when data identical to data preceding immediately preceding data is repeated, the data is replaced with a second special code different from a code to be applied when the data is identical to the immediately preceding data. Accordingly, succession of a condition in which a malfunction is liable to occur and which is established with a combination of two data items can be resolved. In relation to the present embodiment, an example in which the special code is employed in case data is identical to data preceding immediately preceding data will be described. Even when data is identical to data that precedes the data preceding the immediately preceding data or data that precedes two data items preceding the immediately preceding data, the present embodiment can be applied.

What is referred to as the condition under which a malfunction is liable to occur is a condition under which a frequency such as the frequency of a signal 11001 10011 00110 01100 looks like a double frequency. Namely, when four data items are combined, a state in which the number of edges is small takes place. Otherwise, a signal that is erroneously taken for a signal with a different frequency is produced.

Specifically, as shown in FIG. 13, when the same data is repeatedly inputted in units of two codes, the second or subsequent repetitive transfer data is encoded into a special code. In the present embodiment, when immediately preceding data is repeated, the first special code identical to that employed in the embodiment 1, such as, 10101 01010 is applied. When data preceding the immediately preceding data is repeated, a second code 01010 10101 is applied. Similarly to that in the embodiment 1, the first special code 1010101010 is a signal identical to a blanking signal 1010101010. The second special code 0101010101 is a signal obtained by reversing the logic levels of the blanking signal 1010101010.

In FIG. 13, input data items of ECh, 79h, 03h, 70h, and 03h are encoded using the encoding table shown in FIG. 2A and the first and second special codes. Specifically, the input data 79h is encoded into encoded data of 11001 10011, and the input data 03h is encoded into encoded data of 00111 10100.

Since the input data 79h is repeated every other time, the second 79h is converted into the second special code 01010 10101. Likewise, since the input data 03h is repeated every other time, the second 03h is converted into the special code 01010 10101. Accordingly, the frequency of production of a successive-bit pattern that is liable to be erroneously detected can be diminished.

Figure 14:
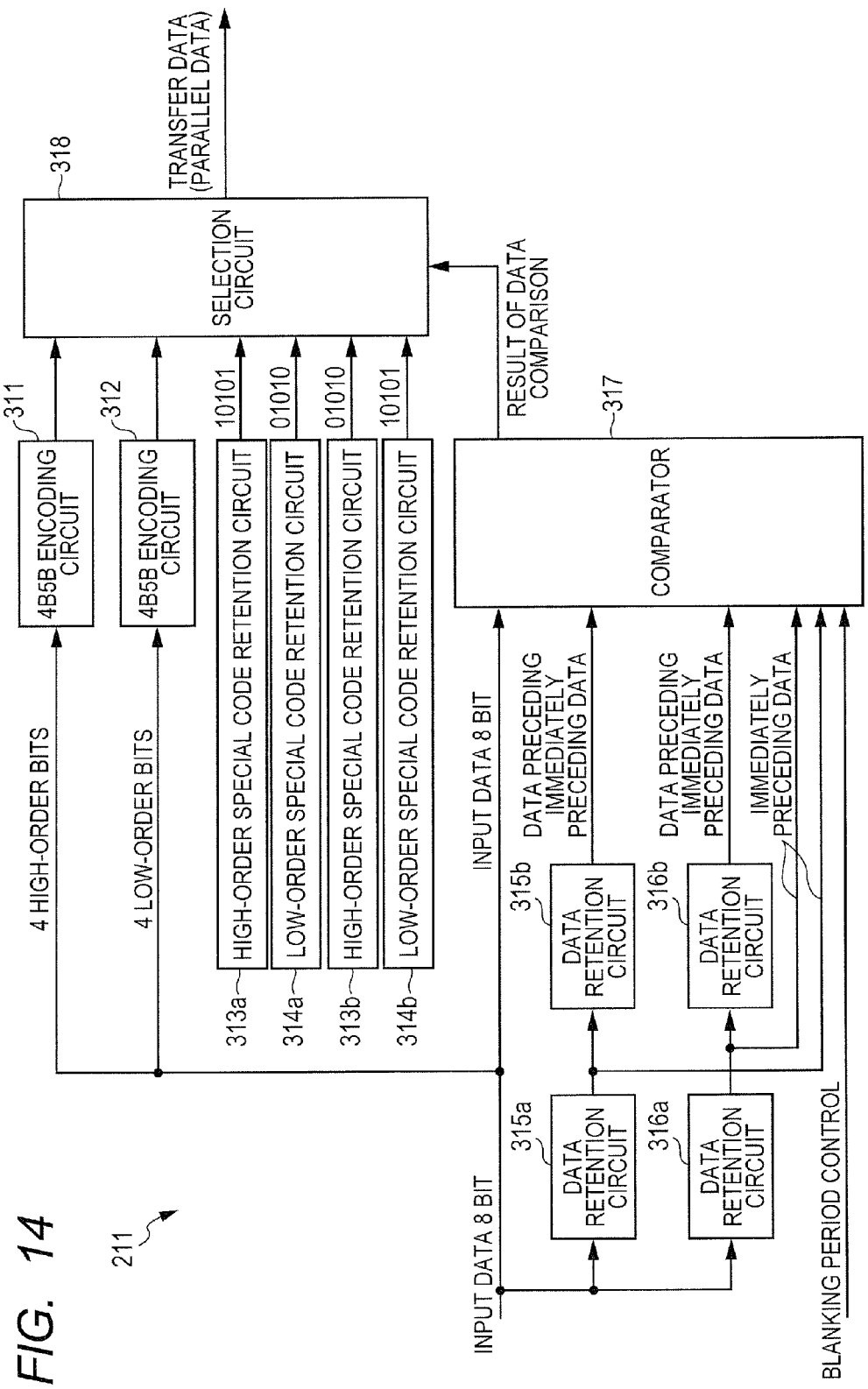
FIG. 14 is a block diagram showing the configuration of a transfer data conversion circuit relating to the embodiment 2.
Figure 15:
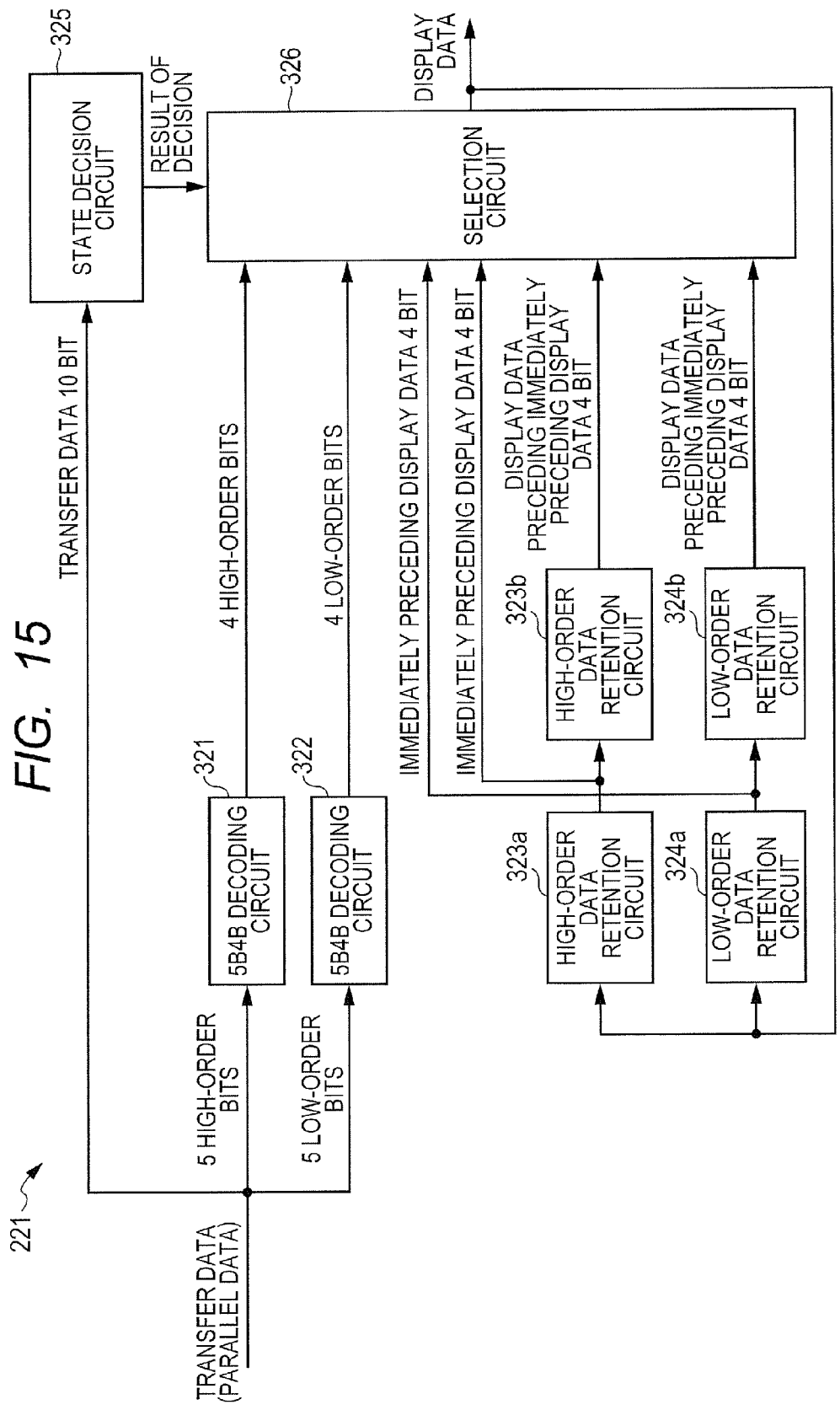
FIG. 15 is a block diagram showing the configuration of a receiving data conversion circuit relating to the embodiment 2.

The overall configuration of the display device data transmission system 100 is identical to that shown in FIG. 6 relating to the embodiment 1. Referring to FIG. 14 and FIG. 15, the configurations of a transfer data conversion circuit and receiving data conversion circuit will be described below.

FIG. 14 shows the configuration of the transfer data conversion circuit 211 relating to the present embodiment. Compared with that shown in FIG. 8 relating to the embodiment 1, the transfer data conversion circuit 211 shown in FIG. 14 includes data retention circuits that retain data preceding immediately preceding data, and special code retention circuits that retain a special code with which the data preceding the immediately preceding data is replaced. The other components are identical to those shown in FIG. 8.

Specifically, as shown in FIG. 14, the transfer data conversion circuit 211 includes 4B5B encoding circuits 311 and 312, a high-order special code retention circuit 313a, a low-order special code retention circuit 314a, a high-order special code retention circuit 313b, a low-order special code retention circuit 314b, data retention circuits 315a and 316a, data retention circuits 315b and 316b, a comparator 317, and a selection circuit 318.

The high-order special code retention circuit 313a and low-order special code retention circuit 314a are circuits that retain the first special code similarly to those in the embodiment 1, and can be said to be circuits that produce the first special code and feed it to the selection circuit 318. The first special code is a code to be outputted when input data is identical to immediately preceding input data. The five high-order bits of the first special code to be retained by the high-order special code retention circuit 313a are 10101, and the five low-order bits of the first special code to be retained by the low-order special code retention circuit 314a are 01010.

The high-order special code retention circuit 313b and low-order special code retention circuit 314b are circuits that retain the second special code, and can be said to be circuits that produce the second special code and feed it to the selection circuit 318. The second special code is a code to be outputted when input data is identical to data preceding immediately preceding data. The second special code is a code that is not stipulated in the 4B5B encoding method, a code whose bit change rate is high, and a code different from the first special code.

The high-order special code retention circuit 313b retains the five high-order bits of the second special code to be used to convert the four high-order bits of input data of eight bits long, and feeds the bits to the selection circuit 318. The five high-order bits of the second special code are 01010 in this example. The low-order special code retention circuit 314b retains the five low-order bits of the second special code to be used to convert the four low-order bits of the input data of eight bits long, and feeds the five low-order bits to the selection circuit 318. The five low-order bits of the second special code are 10101 in this example.

The data retention circuits 315a and 316a are, similarly to those in the embodiment 1, circuits that retain input data inputted at immediately preceding timing (input data that is an object of encoding at the immediately preceding timing). The data retention circuits 315b and 316b are circuits that retain input data inputted at timing preceding the immediately preceding timing (input data that is an object of encoding at the timing preceding the immediately preceding timing).

The data retention circuit 315a retains the four high-order bits of the input data inputted at the timing of an initial clock, and outputs the retained four high-order bits to the comparator 317 at the timing of a subsequent clock. At the timing, the data retention circuit 315b retains the four high-order bits of the input data, which are outputted from the data retention circuit 315a, and outputs the retained four high-order bits to the comparator 317 at the timing of a further subsequent clock.

The data retention circuit 316a retains the four low-order bits of the input data inputted at the timing of the initial clock, and outputs the retained four low-order bits to the comparator 317 at the timing of the subsequent clock. At the timing, the data retention circuit 316b retains the four low-order bits of the input data which are outputted from the data retention circuit 316a, and outputs the retained four low-order bits to the comparator 317 at the timing of the further subsequent clock.

The comparator 317 compares current input data with immediately preceding input data, which is retained by the data retention circuits 315a and 316a, so as to see if the current input data is identical to the immediately preceding input data, and outputs the result of the comparison to the selection circuit 318. Further, the comparator 317 compares the current input data with input data, which precedes the immediately preceding input data and is retained by the data retention circuits 315b and 316b, so as to see if the current input data is identical to the input data preceding the immediately preceding input data, and outputs the result of the comparison to the selection circuit 318.

The selection circuit 318 selects the encoded data produced by the 4B5B encoding circuits 311 and 312, the first special code retained by the high-order special code retention circuit 313a and low-order special code retention circuit 314a, or the second special code, which is retained by the high-order special code retention circuit 313b and low-order special code retention circuit 314b, on the basis of the result of the comparison performed by the comparator 317, and outputs the selected data or code as transfer data.

If the result of the comparison performed by the comparator 317 demonstrates that the four high-order bits of the current input data are different from the four high-order bits of each of the immediately preceding input data and the data preceding the immediately preceding input data, the selection circuit 318 outputs the five high-order bits of encoded data which are produced by the 4B5B encoding circuit 311. If the four high-order bits of the current input data are identical to the four high-order bits of the immediately preceding input data, the selection circuit 318 outputs the five high-order bits of the first special code which are retained by the high-order special code retention circuit 313a. If the four high-order bits of the current input data are identical to the four high-order bits of the data preceding the immediately preceding input data, the selection circuit 318 outputs the five high-order bits of the second special code which are retained by the high-order special code retention circuit 313b.

If the result of comparison performed by the comparator 317 demonstrates that the four low-order bits of the current input data are different from the four low-order bits of each of the immediately preceding input data and the data preceding the immediately preceding input data, the selection circuit 318 outputs the five low-order bits of encoded data which are produced by the 4B5B encoding circuit 312. If the four low-order bits of the current input data are identical to the four low-order bits of the immediately preceding input data, the selection circuit 318 outputs the five low-order bits of the first special code which are retained by the low-order special code retention circuit 314a. If the four low-order bits of the current input data are identical to the four low-order bits of the data preceding the immediately preceding input data, the selection circuit 318 outputs the five low-order bits of the second special code which are retained by the low-order special code retention circuit 314b.

FIG. 15 shows the configuration of the receiving data conversion circuit 221 relating to the present embodiment. Compared with FIG. 9 relating to the embodiment 1, in FIG. 15, the receiving data conversion circuit 221 includes data retention circuits that retain data preceding immediately preceding data, and a selection circuit that selects the data preceding the immediately preceding data according to the second special code. The other components are identical to those shown in FIG. 9.

Specifically, as shown in FIG. 15, the receiving data conversion circuit 221 includes 5B4B decoding circuits 321 and 322, a high-order data retention circuit 323a, a low-order data retention circuit 324a, a high-order data retention circuit 323b, a low-order data retention circuit 324b, a state decision circuit 325, and a selection circuit 326.

The high-order data retention circuit 323a and low-order data retention circuit 324a are, similarly to those in the embodiment 1, circuits that retain decoded data (display data) produced at immediately preceding timing. The high-order data retention circuit 323b and low-order data retention circuit 324b are circuits that retain decoded data (display data) produced at timing preceding the immediately preceding timing.

The high-order data retention circuit 323a retains the four high-order bits of the decoded data produced at the timing of an initial clock, and outputs the retained four high-order bits to the selection circuit 326 at the timing of a subsequent clock. At the timing, the high-order data retention circuit 323b retains the four high-order bits of the decoded data which are outputted from the high-order data retention circuit 323a, and outputs the retained four high-order bits to the selection circuit 326 at the timing of a further subsequent clock.

The low-order retention circuit 324a retains the four low-order bits of the decoded data produced at the timing of the initial clock, and outputs the retained four low-order bits to the selection circuit 326 at the timing of the subsequent clock. At the timing, the low-order data retention circuit 324b retains the four low-order bits of the decoded data which are outputted from the low-order data retention circuit 324a, and outputs the retained four low-order bits to the selection circuit 326 at the timing of the further subsequent clock.

The state decision circuit 325 decides whether the inputted transfer data is the first special code, and outputs the result of the decision. In addition, the state decision circuit 325 decides whether the inputted transfer data is the second special code, and outputs the result of the decision.

The selection circuit 326 outputs the decoded data produced by the 5B4B decoding circuits 321 and 322, the decoded data retained by the high-order data retention circuit 323a and low-order data retention circuit 324a, or the decoded data, which is retained by the high-order data retention circuit 323b and low-order data retention circuit 324b, on the basis of the result of the decision made by the state decision circuit 325, and outputs the decoded data as display data.

If the result of the decision made by the state decision circuit 325 demonstrates that the transfer data is neither the first nor second special code, the selection circuit 326 outputs the decoded data produced by the 5B4B decoding circuits 321 and 322. If the transfer data is the first special code, the selection circuit 326 outputs the immediately preceding decoded data retained by the high-order data retention circuit 323a and low-order data retention circuit 324a. If the transfer data is the second special code, the selection circuit 326 outputs the decoded data that precedes the immediately preceding decoded data and is retained by the high-order data retention circuit 323b and low-order data retention circuit 324b.

Figure 17:
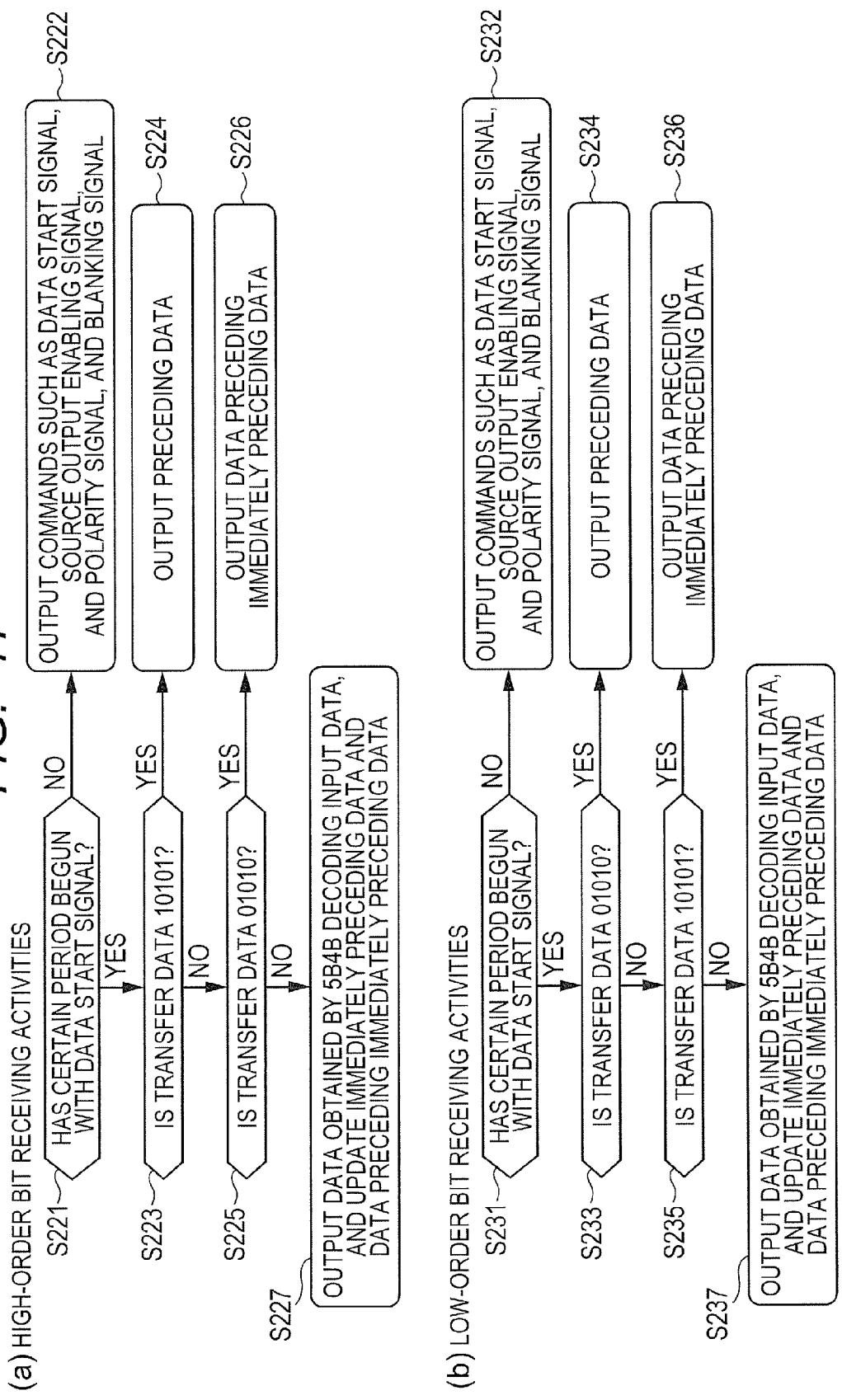
FIG. 17A and FIG. 17B are flowcharts describing receiving activities to be performed by the transmission system in accordance with the embodiment 2.
Figure 18:
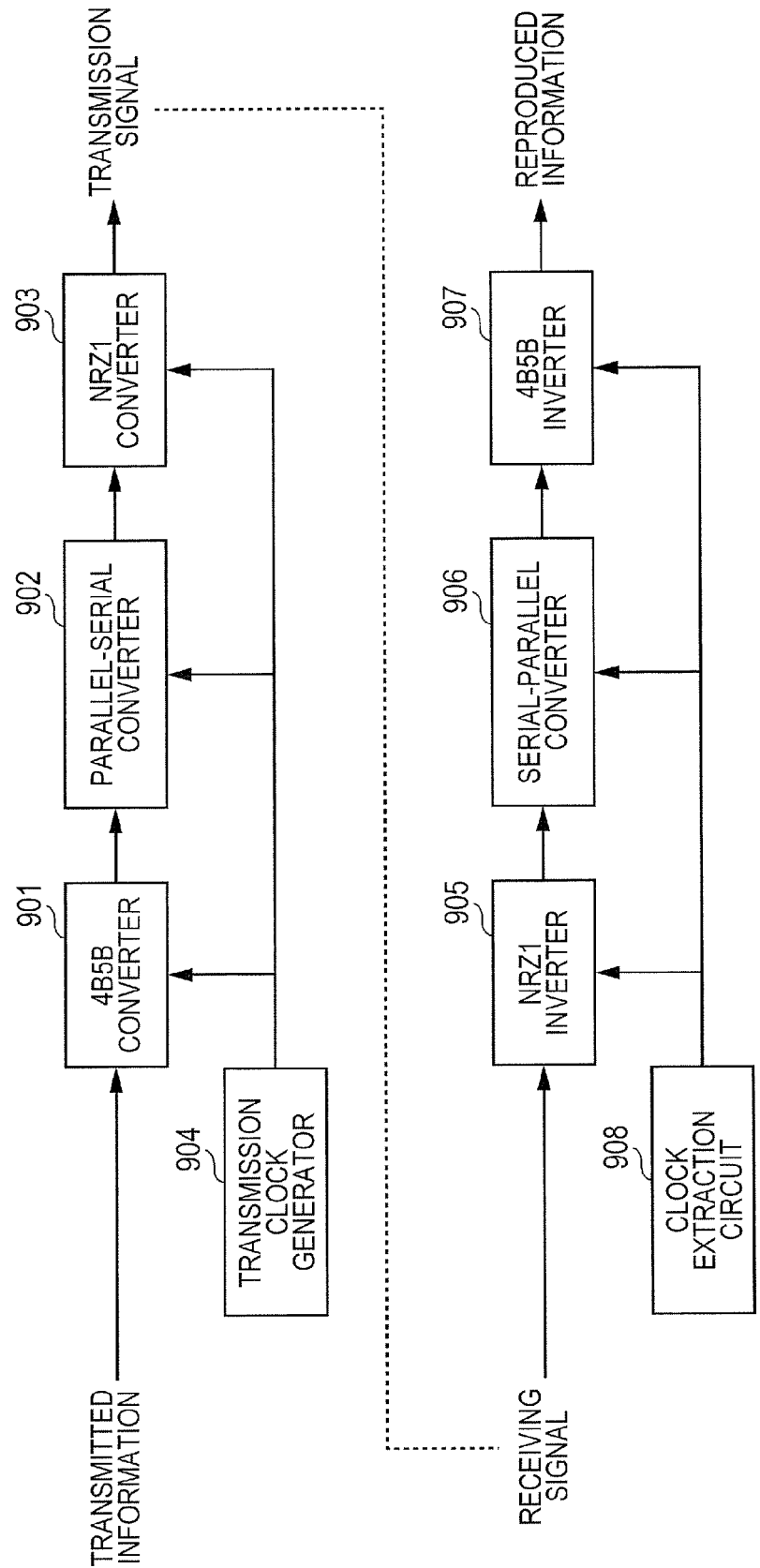
FIG. 18 is a diagram showing the configuration of a related art.
Figure 19:
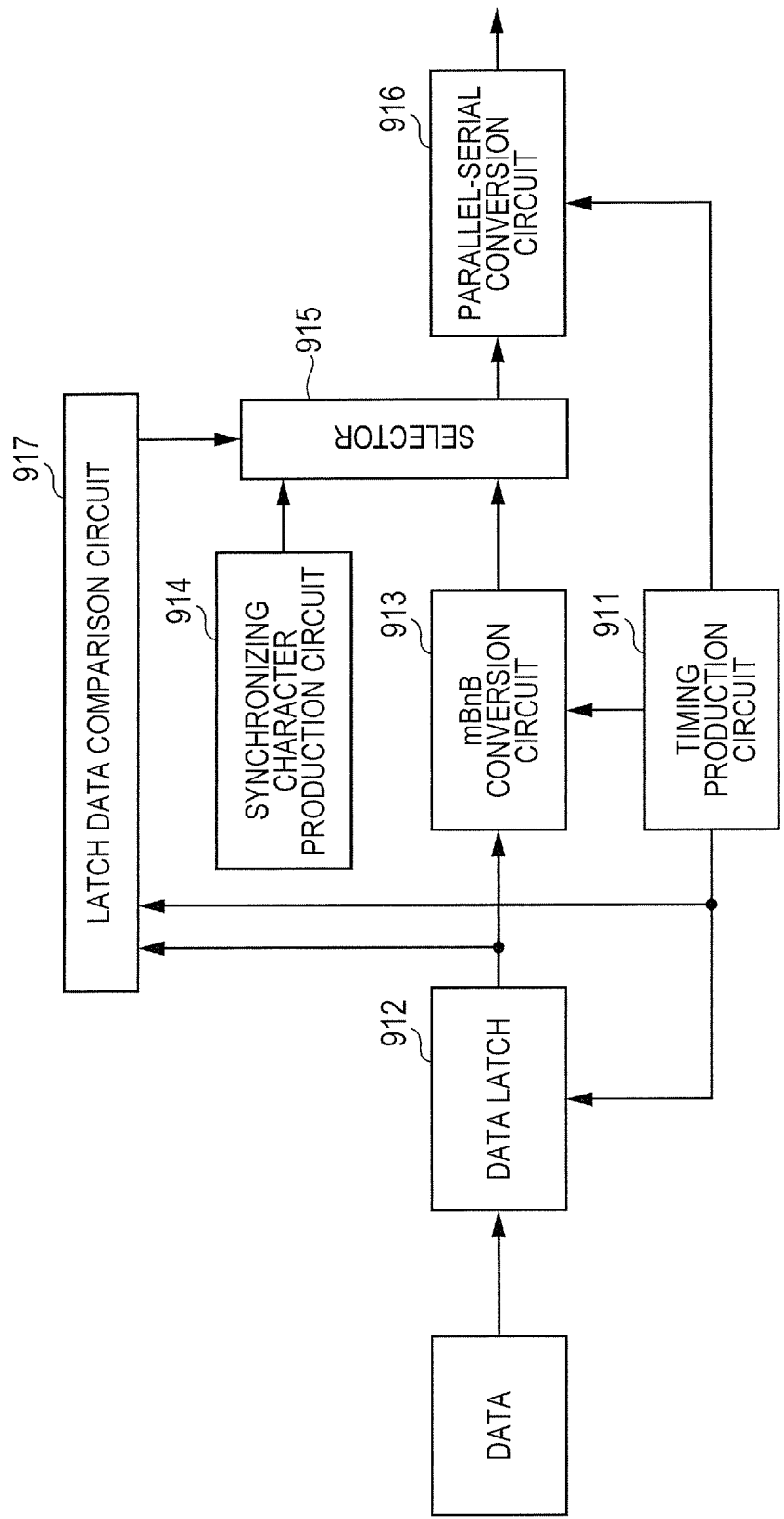
FIG. 19 is a diagram showing the configuration of a related art.

Referring to FIG. 16 and FIG. 17, activities of the data transmission circuit 111 of the timing controller 110 and the data receiving circuit 121 of the display driver 120 which relate to the present embodiment will be described below.

A difference from the embodiment 1 is that when current data is identical to data preceding immediately preceding data, the current data is replaced with a special code that is different from the special code to be applied when the current data is identical to the immediately preceding data. Herein, the first special code to be applied to a copy of the immediately preceding data is 10101 01010, and the second special code to be applied to a copy of the data preceding the immediately preceding data is 01010 10101.

FIG. 16A describes transmission processing for high-order bits in the data transmission circuit 111 including the transfer data conversion circuit 211 shown in FIG. 14, and FIG. 16B describes transmission processing for low-order bits.

As mentioned in FIG. 16A, in transmission processing for high-order bits, the transfer data conversion circuit 211 first decides whether a blanking period has begun (S201). If the blanking period has begun, the data start signal, source output enabling signal (output timing signal), polarity signal, and blanking signal are outputted from the selection circuit 318 (S202).

If the blanking period is found at S201 not to have begun, that is, if a display period has begun, the transfer data conversion circuit 211 decides whether the four high-order bits of input data are identical to the four high-order bits of immediately preceding input data (S203). If the four high-order bits of the input data are identical to the four high-order bits of the immediately preceding input data, the selection circuit 318 outputs a high-order special code 10101 that corresponds to the five high-order bits of the first special code (S204).

If the four high-order bits of the input data are found at S203 to be different from the four high-order bits of the immediately preceding input data, the transfer data conversion circuit 211 decides whether the four high-order bits of the input data are identical to the four high-order bits of input data preceding the immediately preceding input data (S205). If the four high-order bits of the input data are identical to the four high-order bits of the input data preceding the immediately preceding input data, the selection circuit 318 outputs the high-order special code 01010 that corresponds to the five high-order bits of the second special code (S206).

If the four high-order bits of the input data are found at S205 to be different from the four high-order bits of the input data preceding the immediately preceding input data, the selection circuit 318 outputs five high-order bits of encoded data into which the four high-order bits of the input data are 4B5B-encoded (S207).

As mentioned in FIG. 16B, in transmission processing for low-order bits, the transfer data conversion circuit 211 first decides whether a blanking period has begun (S211). If the blanking period has begun, the data start signal, source output enabling signal (output timing signal), polarity signal, and blanking signal are outputted from the selection circuit 318 (S212).

If the blanking period is found at S211 not to have begun, that is, a display period has begun, the transfer data conversion circuit 211 decides whether the four low-order bits of the input data are identical to the four low-order bits of the immediately preceding input data (S213). If the four low-order bits of the input data are identical to the four low-order bits of the immediately preceding data, the selection circuit 318 outputs a low-order special code 01010 that corresponds to the five low-order bits of the first special code (S214).

If the four low-order bits of the input data are found at S213 to be different from the four low-order bits of the immediately preceding input data, the transfer data conversion circuit 211 decides whether the four low-order bits of the input data are identical to the four low-order bits of input data preceding the immediately preceding input data (S215). If the four low-order bits of the input data are identical to the four low-order bits of the input data preceding the immediately preceding input data, the selection circuit 318 outputs a low-order special code 10101 that corresponds to the five low-order bits of the second special code (S216).

If the four low-order bits of the input data are found at S215 to be different from the four low-order bits of the input data preceding the immediately preceding input data, the selection circuit 318 outputs five low-order bits of encoded data into which the four low-order bits of the input data are 4B5B-encoded (S217).

FIG. 17A describes receiving processing for high-order bits in the data receiving circuit 121 including the receiving data conversion circuit 221 shown in FIG. 15, and FIG. 17B describes receiving processing for low-order bits.

As mentioned in FIG. 17A, in receiving processing for high-order bits, the receiving data conversion circuit 221 first decides whether a certain period has begun with a data start signal (S211). If a decision is made that the certain period has not begun with the data start signal, that is, a blanking period has begun, the data start signal, source output enabling signal (output timing signal), polarity signal, and blanking signal are outputted (S222).

If the certain period is found at S221 to have begun with the data start signal, that is, the display period is found at S221 to have begun, whether the five high-order bits of transfer data are identical to the five high-order bits 10101 of the first special code is decided (S223). If a decision is made that the five high-order bits of the transfer data are identical to the five high-order bits of the first special code, the selection circuit 326 outputs the four high-order bits of the immediately preceding decoded data (S224).

If a decision is made at S223 that the five high-order bits of the transfer data are different from the five high-order bits of the first special code, whether the five high-order bits of the transfer data are identical to the five high-order bits 01010 of the second special code (S225). If a decision is made that the five high-order bits of the transfer data are identical to the five high-order bits of the second special code, the selection circuit 326 outputs the four high-order bits of decoded data preceding the immediately preceding decoded data (S226).

If a decision is made at S225 that the five high-order bits of the transfer data are different from the five high-order bits of the first special code, the selection circuit 326 outputs four high-order bits of decoded data into which the five high-order bits of the transfer data are 5B4B-decoded (S227). At this time, the four high-order bits of the decoded data retained by the high-order data retention circuits 323a and 323b are updated.

As mentioned in FIG. 7B, in receiving processing of low-order bits, the receiving data conversion circuit 221 first decides whether the certain period has begun with the data start signal (S231). If a decision is made that the blanking period has begun, the data start signal, source output enabling signal (output timing signal), polarity signal, and blanking signal are outputted (S232).

If a decision is made at S231 that the certain period has begun with the data start signal, that is, the display period has begun, whether the five low-order bits of the transfer data are identical to the five low-order bits 01010 of the first special code (S233). If a decision is made that the five low-order bits of the transfer data are identical to the five low-order bits of the first special code, the selection circuit 326 outputs the four low-order bits of the immediately preceding decoded data (S234).

If a decision is made at S233 that the five low-order bits of the transfer data are different from the five low-order bits of the first special code, whether the five low-order bits of the transfer data are identical to the five low-order bits 10101 of the second special code is decided (S235). If a decision is made that the five low-order bits of the transfer data are identical to the five low-order bits of the second special code, the selection circuit 326 outputs the four low-order bits of the decoded data preceding the immediately preceding decoded data (S236).

If a decision is made at S235 that the five low-order bits of the transfer data are different from the five low-order bits of the second special code, the selection circuit 326 outputs four low-order bits of decoded data into which the five low-order bits of the transfer data are 5B4B-decoded (S237). At this time, the four low-order bits of the decoded data retained by the low-order data retention circuits 324a and 324b are updated.

A decision may be made using only the five high-order or low-order bits of the first or second special code, and a repetitive output may be provided. Otherwise, if both five high-order bits and five low-order bits are identical to the five high-order bits and five low-order bits of the first or second special code, repetitive outputs (copies) may be provided.

As described so far, in the present embodiment, in addition to the constituent feature of the embodiment 1, when data preceding immediately preceding data is repeated, the second special code is used for encoding. Accordingly, since repetition of a 4B5B code does not take place, repetition of a condition under which a malfunction is liable to occur can be more reliably eliminated than that in the embodiment 1.

When data is transferred in units of two codes, if data transferred prior to immediately preceding data is identical to data to be sent at present, data that exhibits a high bit change rate and differs from the first special code is assigned as the second special code so that the data preceding the immediately preceding data (the fourth latest code) can be copied. If data has logic levels opposite to those of the first special code, that is, the high-order bits of the data are 01010 and the low-order bits are 10101, a decision is made that the data preceding immediately preceding data is repeated. Accordingly, data items 11001 10011 00110 01100 are repeated, the repetitive data items to be sent next are converted into 01010 10101 01010 10101.

Accordingly, repetition of successive-bit data whose duty cycle is 50% can be diminished, and data exhibiting a high bit change rate can be transferred. Eventually, stable fast transfer can be achieved.

The present invention devised by the present inventors has been concretely described based on the embodiments. Needless to say, the present invention is not limited to the embodiments but can be modified in various manners without a departure from the gist.

For example, in the aforesaid embodiments, input data that has not been encoded is identical to previous data, a special code is used for encoding. The special code may be used only when it is needed. The bit change rate of the input data may be detected. If the bit change rate of the input data is low, the special code may be used for encoding. If the bit change rate of the input data is high, the special code may not be used but the input data may be encoded according to an ordinary encoding method. In this case, while the use of the special code is suppressed, the same advantage as that provided by the aforesaid embodiments can be provided.

In the aforesaid embodiments, whether input data that has not been encoded is identical to previous data is decided. If the input data is identical to previous data, a special code is used for encoding. Alternatively, encoded data may be checked to see if it is identical to previous data. If successive encoded data items are identical to each other, one of the encoded data items may be replaced with the special code. Even in this case, the same advantage as that provided by the aforesaid embodiments can be provided.

In the aforesaid embodiments, an mBnB encoding method such as a 4B5B encoding method has been described as a clock embedded encoding method. Alternatively, any other clock embedded encoding method will do. Further, the present invention may be adapted to an encoding method other than the clock embedded encoding methods.

What is claimed is:

1. An encoder comprising:
   an encoding unit that performs encoding according to a predetermined encoding method which is a clock embedded encoding method;
   a production unit that produces a special code which is not stipulated in the predetermined encoding method and which exhibits a higher bit change rate than that produced according to the predetermined encoding method does; and
   an encoding output unit that, if first and second input data items which have not been encoded by the encoding unit are identical to each other, outputs first encoded data into which the first input data is encoded by the encoding unit, and outputs the special code as second encoded data, into which the second input data is encoded, successively to the first encoded data.

2. The encoder according to claim 1, wherein:
   the first and second input data items are display data items according to which an image is displayed on a display device,
   the encoding output unit outputs a blanking signal, which indicates a blanking period, during the blanking period other than a display period during which the image is displayed on the display device according to the display data items, and
   during the display period, a signal identical to the blanking signal or a signal whose logic levels are reverses of those of the blanking signal is outputted.

3. The encoder according to claim 1, wherein if the first and second input data items are different from each other, the encoding output unit outputs data, into which the second input data is encoded by the encoding unit, as the second encoded data.

4. The encoder according to claim 1, further comprising:
   a retention unit that retains the first input data out of the sequentially inputted first and second input data items; and
   a comparison unit that compares the second input data with the first input data retained by the retention unit, wherein
   the encoding output unit outputs the first and second encoded data items on the basis of the result of comparison performed by the comparison unit.

5. The encoder according to claim 1, wherein:
   if third input data that has not been encoded by the encoding unit is identical to the first input data, the encoding output unit outputs a second special code, which is different from the first special code, as third encoded data, into which the third input data is encoded, successively to the second encoded data.

6. The encoder according to claim 5, wherein if the first and third input data items are different from each other, the encoding output unit outputs data, into which the third input data is encoded by the encoding unit, as the third encoded data.

7. The encoder according to claim 5, further comprising:
   a retention unit that retains the first input data out of the sequentially inputted first, second, and third data items; and
   a comparison unit that compares the third input data with the first input data retained by the retention unit, wherein
   the encoding output unit outputs the first and third encoded data items on the basis of the result of comparison performed by the comparison unit.

8. The encoder according to claim 1, wherein if the successive first and second encoded data items exhibit a low bit change rate, the encoding output unit outputs the special code.

9. The encoder according to claim 1, wherein the predetermined encoding method is an mBnB encoding method for encoding data of m bits long into n bits where n is larger than m.

10. A decoder comprising:
    a decoding unit that performs decoding according to a predetermined encoding method which is a clock embedded encoding method;
    a retention unit that retains decoded data produced by the decoding unit; and
    a decoding output unit that, out of successive first and second encoded data items which have not been decoded by the decoding unit, if the second encoded data is a special code which is not stipulated in the predetermined encoding method and which exhibits a higher bit change rate than that produced according to the predetermined encoding method does, outputs first decoded data into which the first encoded data is decoded by the decoding unit, and outputs data, which is identical to the first decoded data and is retained by the retention unit, as second decoded data into which the second encoded data is decoded.

11. The decoder according to claim 10, wherein if the second encoded data is different from the special code, the decoding output unit outputs data, into which the second encoded data is decoded by the decoding unit, as the second decoded data.

12. The decoder according to claim 10, wherein:
    the first and second decoded data items are display data items according to which an image is displayed on a display device; and
    during a display period during which the image is displayed on the display device according to the display data items, the decoding output unit outputs the first and second decoded data items that are associated with the first and second encoded data items respectively.

13. The decoder according to claim 12, wherein when a data start signal that indicates the beginning of the display period is inputted, the decoding output unit regards a certain period, which begins with the data start signal, as the display period, and outputs the first and second decoded data items that are associated with the first and second encoded data items respectively.

14. The decoder according to claim 10, wherein assuming that the third encoded data succeeds the first and second encoded data items, if the third encoded data is a second special code different from the special code, the decoding output unit outputs the data, which is identical to the first decoded data and is retained by the retention unit, as third decoded data into which the third encoded data is decoded.

15. The decoder according to claim 14, wherein if the third encoded data is different from the special code, the decoding output unit outputs data, into which the third encoded data is decoded by the decoding unit, as the third decoded data.

16. The decoder according to claim 10, wherein the predetermined encoding method is an mBnB encoding method for encoding data of m bits long into n bits where n is larger than m.

17. A transmission system having an encoder and a decoder coupled to each other over a transmission line, wherein:
the encoder comprises
an encoding unit that performs encoding according to a predetermined encoding method which is a clock embedded encoding method,
a production unit that produces a special code which is not stipulated in the predetermined encoding method and which exhibits a higher bit change rate than that produced according to the predetermined encoding method does, and
an encoding output unit that, if first and second input data items that have not been encoded by the encoding unit are identical to each other, outputs first encoded data into which the first input data is encoded by the encoding unit, and outputs the special code as second encoded data, into which the second input data is encoded, successively to the first encoded data; and
the decoder comprises
a decoding unit that performs decoding according to the predetermined encoding method,
a retention unit that retains decoded data produced by the decoding unit, and
a decoding output unit that, if the second encoded data out of the first and second encoded data items inputted over the transmission line is the special code, outputs first decoded data into which the first encoded data is decoded by the decoding unit, and outputs data, which is identical to the first decoded data and is retained by the retention unit, as second decoded data into which the second encoded data is decoded.

18. The transmission system according to claim 17, wherein if the first and second input data items are different from each other, the encoding output unit outputs data, into which the second input data is encoded by the encoding unit, as the second encoded data.

19. The transmission system according to claim 17, wherein if the second encoded data is different from the special code, the decoding output unit outputs data, into which the second encoded data is decoded by the decoding unit, as the second decoded data.

* * * * *

UNITED STATES PATENT AND TRADEMARK OFFICE
CERTIFICATE OF CORRECTION

PATENT NO. : 8,983,214 B2
APPLICATION NO. : 13/865734
DATED : March 17, 2015
INVENTOR(S) : Hirobumi Furihata and Takashi Nose It is certified that error appears in the above-identified patent and that said Letters Patent is hereby corrected as shown below:

Specification
Column 8, Line 18: Delete "100 µl" and insert -- 10011 --

Signed and Sealed this
Seventeenth Day of November, 2015

Michelle K. Lee
*Director of the United States Patent and Trademark Office*